US011365958B2

United States Patent
Bouldin et al.

(10) Patent No.: US 11,365,958 B2
(45) Date of Patent: *Jun. 21, 2022

(54) SUBTERRANEAN WELL TORPEDO DISTRIBUTED ACOUSTIC SENSING SYSTEM AND METHOD

(71) Applicant: Saudi Arabian Oil Company, Dhahran (SA)

(72) Inventors: Brett Bouldin, Dhahran (SA); Michael Jervis, Dhahran (SA); Andrey Bakulin, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 709 days.

This patent is subject to a terminal disclaimer.

(21) Appl. No.: 16/393,403

(22) Filed: Apr. 24, 2019

(65) Prior Publication Data

US 2020/0340790 A1 Oct. 29, 2020

(51) Int. Cl.
*E21B 23/00* (2006.01)
*G01V 1/16* (2006.01)
(Continued)

(52) U.S. Cl.
CPC .............. *F42D 3/06* (2013.01); *E21B 47/07* (2020.05); *E21B 47/092* (2020.05);
(Continued)

(58) Field of Classification Search
None
See application file for complete search history.

(56) References Cited

U.S. PATENT DOCUMENTS 2,558,427 A 6/1951 Fagan
2,850,976 A 9/1958 Seifert
(Continued)

FOREIGN PATENT DOCUMENTS

GB 2349440 A 11/2000
GB 2522211 A 7/2015
(Continued)

OTHER PUBLICATIONS

Higginson et al., Advancing The Application of Downhole Fibre Optics with a Novel Low Cost Disposable Deployment Method, 2017, SPE-186124-MS (Year: 2017).*
(Continued)

*Primary Examiner* — Curtis A Kuntz
*Assistant Examiner* — Jerold B Murphy
(74) *Attorney, Agent, or Firm* — Bracewell LLP; Constance G. Rhebergen; Christopher L. Drymalla

(57) ABSTRACT

Provided in some embodiments is a method of distributed acoustic sensing in a subterranean well. The method including advancing a torpedo into a first portion of a wellbore of a subterranean well (the torpedo including a distributed acoustic sensing (DAS) fiber-optic (FO) umbilical that is physically coupled to a surface component and adapted to unspool from the torpedo as the torpedo advances in the wellbore, and an engine adapted to generate thrust to propel the torpedo), and activating the engine to generate thrust to propel advancement of the torpedo within a second portion of the wellbore such that at least some of the DAS FO umbilical is disposed in the second portion of the wellbore.

37 Claims, 8 Drawing Sheets

(51) Int. Cl.
| | |
|---|---|
| *G01V 1/42* | (2006.01) |
| *E21B 47/135* | (2012.01) |
| *F42D 3/06* | (2006.01) |
| *G01V 1/22* | (2006.01) |
| *E21B 47/07* | (2012.01) |
| *E21B 47/092* | (2012.01) |
| *E21B 47/117* | (2012.01) |

(52) U.S. Cl.
CPC .......... *E21B 47/117* (2020.05); *E21B 47/135* (2020.05); *G01V 1/226* (2013.01)

(56) References Cited

U.S. PATENT DOCUMENTS

| | | |
|---|---|---|
| 2,937,824 A | 5/1960 | Krumbholz et al. |
| 3,158,994 A | 12/1964 | Hodgson |
| 3,171,379 A | 3/1965 | Schell, Jr. et al. |
| 3,210,937 A | 10/1965 | Perry, Jr. |
| 3,230,708 A | 1/1966 | Huang et al. |
| 3,252,281 A | 5/1966 | Everett et al. |
| 3,383,861 A | 5/1968 | Bell, Jr. |
| 3,442,083 A | 5/1969 | De Klotz |
| 3,917,007 A | 11/1975 | Tsiferov |
| 3,928,102 A | 12/1975 | Rowe et al. |
| 4,676,310 A | 6/1987 | Scherbatskoy et al. |
| 4,907,763 A | 3/1990 | Pinson |
| 4,997,047 A | 3/1991 | Schroeder |
| 5,012,991 A | 5/1991 | Pinson |
| 5,396,951 A | 3/1995 | Ross |
| 5,570,437 A | 10/1996 | Kluth et al. |
| 5,574,246 A | 11/1996 | Meyers et al. |
| 5,996,930 A | 12/1999 | Katayama et al. |
| 6,269,198 B1 | 7/2001 | Hodgson et al. |
| 6,273,189 B1 | 8/2001 | Gissler et al. |
| 6,411,565 B1 | 6/2002 | Sirmalis et al. |
| 6,581,537 B2 | 6/2003 | McBride et al. |
| 6,845,819 B2 | 1/2005 | Barrett et al. |
| 6,847,034 B2 | 1/2005 | Shah et al. |
| 7,077,200 B1 | 7/2006 | Adnan et al. |
| 7,578,121 B2 | 8/2009 | Chang et al. |
| 7,617,873 B2 | 11/2009 | Lovell et al. |
| 8,079,414 B2 | 12/2011 | Smaardyk et al. |
| 8,981,957 B2 | 3/2015 | Gano et al. |
| 9,109,944 B2 | 8/2015 | Den Boer et al. |
| 9,127,531 B2 | 9/2015 | Maida et al. |
| 9,180,946 B2 | 11/2015 | Fuhr |
| 9,222,333 B2 | 12/2015 | Hoffman et al. |
| 9,726,006 B2 | 8/2017 | Kare |
| 9,869,819 B2 | 1/2018 | Stone et al. |
| 2003/0010495 A1 | 1/2003 | Mendez et al. |
| 2005/0236161 A1 | 10/2005 | Gay et al. |
| 2006/0171821 A1 | 8/2006 | Brown |
| 2008/0073077 A1 | 3/2008 | Tunc et al. |
| 2008/0135259 A1 | 6/2008 | Brown |
| 2008/0272931 A1 | 11/2008 | Auzerais et al. |
| 2009/0050329 A1 | 2/2009 | Johnson et al. |
| 2010/0147587 A1 | 6/2010 | Henderson et al. |
| 2010/0181072 A1* | 7/2010 | Gillan ............... E21B 29/04 166/54.5 |
| 2011/0135247 A1 | 6/2011 | Achara et al. |
| 2012/0080189 A1 | 4/2012 | Marya et al. |
| 2012/0305234 A1 | 12/2012 | Vowels |
| 2013/0025852 A1 | 1/2013 | Edmonstone et al. |
| 2013/0167628 A1 | 7/2013 | Hull et al. |
| 2013/0249705 A1 | 9/2013 | Sharp et al. |
| 2014/0054031 A1 | 2/2014 | Heijnen et al. |
| 2014/0144224 A1 | 5/2014 | Hoffman et al. |
| 2014/0311755 A1 | 10/2014 | Al-Badran |
| 2014/0376332 A1* | 12/2014 | Vigneaux ............. G01V 1/42 367/25 |
| 2015/0184468 A1 | 7/2015 | Sherman |
| 2016/0054109 A1 | 2/2016 | Mohler et al. |
| 2016/0084055 A1 | 3/2016 | Moore et al. |
| 2016/0123081 A1 | 5/2016 | Russell et al. |
| 2016/0168980 A1* | 6/2016 | Bedry ............. E21B 47/07 374/136 |
| 2016/0215578 A1 | 7/2016 | Adnan et al. |
| 2016/0215579 A1 | 7/2016 | Van Der Ende |
| 2016/0237812 A1 | 8/2016 | Foucher et al. |
| 2016/0251941 A1 | 9/2016 | Murphree et al. |
| 2017/0067328 A1 | 3/2017 | Chauffe et al. |
| 2017/0075017 A1 | 3/2017 | Jasskelainen et al. |
| 2017/0145760 A1 | 5/2017 | Poyet et al. |
| 2017/0160422 A1 | 6/2017 | Donderici et al. |
| 2017/0218752 A1 | 8/2017 | Donderici et al. |
| 2017/0268908 A1 | 9/2017 | Difoggio |
| 2017/0314341 A1 | 11/2017 | Lovell et al. |
| 2017/0314372 A1 | 11/2017 | Tolman et al. |
| 2017/0342822 A1 | 11/2017 | Wilson et al. |
| 2018/0058196 A1 | 3/2018 | Jaaskelainen et al. |
| 2018/0066490 A1 | 3/2018 | Kjos |
| 2018/0294118 A1 | 10/2018 | Furuuchi et al. |
| 2020/0200000 A1* | 6/2020 | Langnes ............. E21B 47/135 |

FOREIGN PATENT DOCUMENTS

| | | | |
|---|---|---|---|
| WO | 2011064210 A2 | 6/2011 | |
| WO | WO-2011064210 A2 * | 6/2011 | ............. E21B 23/10 |
| WO | 2013011130 A1 | 1/2013 | |
| WO | 2013049625 A1 | 4/2013 | |
| WO | 2013103908 A1 | 7/2013 | |
| WO | 2014130014 A1 | 8/2014 | |
| WO | 2015047399 A1 | 4/2015 | |
| WO | 2015181541 A2 | 12/2015 | |
| WO | 2016079512 A1 | 5/2016 | |
| WO | 2017009671 A1 | 1/2017 | |
| WO | 2017074365 A1 | 5/2017 | |
| WO | 2017105435 A1 | 6/2017 | |

OTHER PUBLICATIONS

International Search Report and Written Opinion for International Application No. PCT/US2020/029844 (SA5903PCT) dated Jul. 3, 2020; pp. 1-16.

International Search Report and Written Opinion for International Application No. PCT/US2020/029884 (SA5909), report mail date Feb. 15, 2021; pp. 1-14.

International Search Report and Written Opinion for International Application No. PCT/US2020/029860 (SA5904), report mail date Jan. 28, 2021; pp. 1-18.

King, D. et al.; "Interpreting complex data from a three-sensor multipoint optical fibre ethanol concentration sensor system using artificial neural network pattern recognition" Measurement Science and Technology 15 (2004); pp. 1560-1567.

AFL "MiniBend(R) Fiber Optic Component for Downhole Double-ended Systems and Optical Connectivity" availble at: https://www.aflglobal.com/productlist/Product-Lines/Fiber-Optic-Cable/MiniBend_for_Downhole_Double-Ended_Systems_Optic/doc/MiniBend.aspx; p. 1.

Bakulin, Andrey et al.; "Smart DAS upholes for near surface model building and deep imaging with vertical arrays" ICEG2017, Oct. 9-12, 2017, Al-Ain, Abu Dhabi, UAE; pp. 252-255.

Miller, Douglas E.; "DAS and DTS at Brady Hot Springs: Observations about Coupling and Coupled Interpretations" SGP-TR-213, 43rd Workshop on Geothermal Reservoir Engineering, Stanford University, Feb. 12-14, 2018; pp. 1-13.

Wikipedia; "APR-3E torpedo" available as of Apr. 17, 2018 at: https://en.wikipedia.org/wiki/APR-3E_torpedo; pp. 1-2.

Wikipedia; "Rocket engine" available as of Feb. 21, 2019 at: https://en.wikipedia.org/wiki/Rocket_engine; pp. 1-26.

Wikipedia; "Torpedo" available as of Feb. 21, 2019 at: https://en.wikipedia.org/wiki/Torpedo; pp. 1-19.

Higginson et al., "Advancing The Application of Downhole Fibre Optics with a Novel Low Cost Disposable Deployment Method", SPE Offshore Europe Conference & Exhibition, 2017, pp. 1-9, Soceity of Petroleum Engineers.

(56) References Cited

OTHER PUBLICATIONS

International Search Report and Written Opinion for related PCT application PCT/US2019/014896 (SA5819) dated Apr. 9, 2019; pp. 1-14.

* cited by examiner

SUBTERRANEAN WELL TORPEDO DISTRIBUTED ACOUSTIC SENSING SYSTEM AND METHOD

FIELD

Embodiments relate generally to developing hydrocarbon wells, and more particularly to deploying devices into hydrocarbon wells.

BACKGROUND

A well generally includes a wellbore (or a "borehole") that is drilled into the Earth to provide access to a geologic formation below the Earth's surface (or a "subsurface formation"). The well may facilitate the extraction of natural resources, such as hydrocarbons or water, from the subsurface formation, facilitate the injection of substances, such as water or gas, into the subsurface formation, or facilitate the evaluation and monitoring of the subsurface formation. In the petroleum industry, hydrocarbon wells are often drilled to extract (or "produce") hydrocarbons, such as oil and gas, from subsurface formations. The term "oil well" is often used to refer to a well designed to produce oil. Similarly the term "gas well" is often used to refer to a well designed to produce gas. In the case of an oil well, some natural gas is typically produced along with oil. A well producing both oil and natural gas is sometimes referred to as an "oil and gas well" or an "oil well." The term "hydrocarbon well" is often used to describe wells that facilitate the production of hydrocarbons, including oil wells and oil and gas wells.

Creating a hydrocarbon well typically involves several stages, including a drilling stage, a completion stage and a production stage. The drilling stage involves drilling a wellbore into a subsurface formation that is expected to contain a concentration of hydrocarbons that can be produced. The portion of the subsurface formation expected to contain hydrocarbons is often referred to as a "hydrocarbon reservoir," or simply a "reservoir." The drilling process is normally facilitated by a drilling rig that sits at the Earth's surface. The drilling rig can provide for operating a drill bit to cut the wellbore, hoisting, lowering and turning drill pipe and tools, circulating drilling fluids in the wellbore, and generally controlling operations in the wellbore (often referred to as "down-hole" operations). The completion stage involves making the well ready to produce hydrocarbons. In some instances, the completion stage includes installing casing pipe in the wellbore, cementing the casing pipe in place, perforating the casing pipe and cement, installing production tubing, installing down-hole valves for regulating production flow, and pumping fluids into the wellbore to fracture, clean or otherwise prepare the reservoir and well to produce hydrocarbons. The production stage involves producing hydrocarbons from the reservoir by way of the well. During the production stage, the drilling rig is normally removed and replaced with a collection of valves at the surface (often referred to as "surface valves" or a "production tree"), and valves are installed in the wellbore (often referred to as "down-hole valves"). These surface and down-hole valves can be operated to regulate pressure in the wellbore, to control production flow from the wellbore and to provide access to the wellbore if needed. Sensors are often deployed at the surface or in the wellbore to monitor the characteristics of the well. For example, pressure and temperature sensors may be deployed in the wellbore to monitor pressure and temperature in the wellbore. A pump jack or other mechanism can provide lift that assists in extracting hydrocarbons from the reservoir, especially in instances in which the pressure in the well is so low that the produced hydrocarbons do not flow freely to the surface. Flow from an outlet valve of the production tree is normally connected to a distribution network of midstream facilities, such as tanks, pipelines and transport vehicles, which transport the production to downstream facilities, such as refineries and export terminals.

The various stages of creating a hydrocarbon well often include challenges that are addressed to successfully develop the well and the subsurface formation. During the each of the stages, a well operator may need to monitor conditions of the wellbore to assess a current state of the well and to generate and execute a plan to develop the well or other nearby wells. For example, during the production stage of a well, a well operator may deploy devices, such as pressure and temperature sensors, in a wellbore to monitor pressure and temperature of production fluids in the wellbore. Such measurements can be used to assess the current and historical production of the well which can, in turn, be used to develop a field development plan (FDP) for the well and surrounding wells. The FDP may specify target production rates, injection rates or other parameters for the well and surrounding wells. A well operator may conduct operations, such as adjusting production rates, injection rates or other parameters, for the well or other wells in the same subsurface formation in accordance with the FDP in an effort to optimize production from the subsurface formation.

SUMMARY

Applicant has recognized that deploying devices into a well can be critical to successfully operating the well and other wells in the same formation. A well operator may benefit from understanding characteristics of a well extending into a subsurface formation when making decisions regarding how best to operate the well and to develop the subsurface formation. For example, it can be critical for a well operator to know current and historical bottom-hole pressure (BHP) and bottom-hole temperature (BHT) for a well when setting production rates or injection rates for the well, or other wells in the same subsurface formation, to optimize production from the subsurface formation. Thus, it can be critical to place sensors, such as BHP sensors and BHT sensors, in appropriate positions within a wellbore of a hydrocarbon well to acquire well data for the well, including BHP and BHT of the well. As another example, it can be critical for a well operator to know characteristics of the subsurface formation to determine when and where to drill wells into the subsurface formation, and how to operate wells in the formation. Thus, it can be critical to place formation measurement devices, such as seismic logging devices, to acquire formation data for the subsurface formation. The seismic logging devices can include, for example, acoustic sensors, such as geophones.

Applicants have also recognized that existing techniques for deploying devices into wells suffer from a variety of drawbacks. In some instances, devices are deployed into a well by way of gravity. For example, a device may be suspend from a wireline that is unspooled from the surface to lower the wireline and the device into the wellbore. The wireline may include, for example, an umbilical line that provides for powering and communicating with the device. Although this technique can be suitable for use in vertical wellbores, it may not be suitable for use in horizontal wellbores. For example, if a wellbore includes a horizontal portion, the device may travel down the vertical portion, to the start of the horizontal portion, by way of gravity, but may stop (or "bottom out") at the transition to the horizontal portion. As a result, the device and the wireline may not advance into the horizontal section of the wellbore. In some instances, tractors are used to convey devices further into horizontal wellbores. For example, a tractor device may be suspended from a wireline that is unspooled from the surface to lower the tractor device and the trailing wireline into the wellbore, and the tractor may be driven to pull the tractor and the trailing wireline into the horizontal portion of the wellbore. Although this technique can provide increased access to the horizontal portion of a wellbore, it is typically limited by how far the tractor can pull the trailing wireline. For example, in the case of a lengthy horizontal portion, the tractor may not be capable of generating the power or traction necessary to advance the tractor and the trailing wireline deep into or completely through the horizontal portion of the wellbore. Moreover, the wireline itself may be damaged from friction as it is dragged across the walls of wellbore. As a result, the wireline may need to have a rugged encapsulation that can increase weight and, in turn, reduce the effective range of a tractor pulling the wireline.

Recognizing these and other shortcomings of existing techniques, Applicant has developed novel systems and method for deploying devices into wells by way of a thrust-propelled well torpedo (TPWT) system. In some embodiments, a TPWT system is employed to deploy devices, such as sensors, into a wellbore of a hydrocarbon well, such as an oil well. For example, a TPWT having an engine and carrying a payload, such as sensors or other devices, may be propelled deep into a wellbore of a hydrocarbon well by way of thrust based propulsion.

In some embodiments, a TPWT includes a fiber optic (FO) umbilical that is unspooled from the TPWT as it travels in a wellbore. For example, a TPWT may include a FO umbilical including a FO line that is wrapped (or "spooled") around an integrated spool of the TPWT, and that is unspooled from the TPWT as it travels through the wellbore. An FO umbilical may provide for communication between the TPWT and a control system, such as a well control system located at the surface. For example, an upper end (or "up-hole end") of a FO umbilical of a TPWT may be coupled to a well control system of a well, and a lower end (or "down-hole end") of the FO umbilical may be coupled to a control system (or "controller") of the TPWT. In such an embodiment, the FO umbilical may provide for communication of data between the well control system and the control system of the TPWT.

In some embodiments, the data includes commands relating to controlling operation of the TPWT. For example, the well control system may send, to the controller of the TPWT by way of the FO umbilical, commands dictating operation of the TPWT. In such an embodiment, the controller may execute the commands by controlling corresponding operations of the TPWT. For example, the well control system may send, to the controller of the TPWT by way of the FO umbilical, a command to ignite or extinguish the engine of the TPWT, and the controller may control a fuel supply valve and an igniter of the engine to ignite the engine. In some embodiments, the data includes TPWT operational data relating to operation of the TPWT. For example, the controller of the TPWT may monitor and collect data regarding the operation of the engine, the controller or the payload, such as conditions sensed by sensors of the payload, and send, to the well control system by way of the FO umbilical, TPWT operational data corresponding to the data collected. The TPWT data may, for example, include data that indicates whether the engine is ignited, that indicates a status of fins, rudders or directional thrust systems of the TPWT, that indicates a speed, orientation or location of the TPWT within the wellbore, or that indicates conditions sensed by the sensors. In some embodiments, the well control system generates the commands relating to controlling operation of the TPWT based on the TPWT operational data received from the TPWT controller.

In some embodiments, deployment of a TPWT into a wellbore includes a gravity-driven free-fall of the TPWT in the wellbore, followed by a thrust-driven propulsion of the TPWT further into the wellbore. For example, a TPWT may be released into a free-fall through a first/upper portion of the wellbore (such as a vertical portion of the wellbore) and, upon reaching a trigger point (such as a predefined depth in the wellbore), the engine of the TPWT may be ignited to generate thrust that propels the TPWT in a second/lower portion of the wellbore (such as a horizontal portion of the wellbore). The TPWT may come to rest in a deployment location in the second/lower portion of the wellbore.

In some embodiments, a body of a TPWT is formed of a material adapted to dissolve under exposure to a wellbore environment. The material may include, for example, a magnesium alloy. In such an embodiment, the TPWT may come to rest in a deployment location within the wellbore, and the dissolvable body of the TPWT may dissolve (for example, over the course of several hours, days or weeks), leaving behind the FO umbilical and any non-dissolvable portions of the TPWT, such as a payload of non-dissolvable sensors.

In some embodiments, the use of a dissolvable TPWT body is advantageous. For example, a dissolvable TPWT body can eliminate a need to retrieve the TPWT. Traditional wireline devices are typically lowered into a wellbore and later retrieved (for example, pulled) from the wellbore for reuse or to keep the wireline device from blocking the wellbore. In contrast, a dissolvable TPWT body may be less expensive to produce, eliminating a need for reuse, and may simply dissolve to reduce any blockage of the wellbore. As a result, use of a dissolvable TPWT body can eliminate the need for a retrieval operation, or at least simplify any associated retrieval operation. A retrieval operation, if conducted, may simply include pulling the relatively thin and light FO umbilical and any non-dissolvable portions of the TPWT that remain coupled to the FO umbilical, such as undissolved sensors. Moreover, given that the body of the TPWT may not need to be retrieved, the FO umbilical can be relatively thin and lightweight, which can be advantageous for at least the reasons described here, including extending a range of the TPWT, or facilitating severing of the FO umbilical, if needed.

In some embodiments, use of a FO umbilical is advantageous. For example, in contrast to a relatively heavy line, such as a traditional wireline umbilical, a FO umbilical may have a relatively light weight. This may help to reduce the overall weight of a TPWT, which can enable the TPWT to travel farther into the wellbore or to carry a heavier payload. As a further example, in contrast to a relatively thick line, such as a traditional wireline umbilical, a FO umbilical may have a relatively small diameter and can be severed easily. This may enable a FO umbilical to be run through relatively small ports in the well system, such as through a valve of a wellhead, and may enable the FO umbilical to be easily severed if needed. For example, in the case of an emergency operation that requires closing of a wellhead valve having a FO umbilical run through the valve, the valve can simply be closed, with the closing action severing the FO umbilical. In contrast, a traditional wireline may be too thick or tough to be easily severed by a wellhead valve. Thus, the wireline may need to be removed from the wellbore or severed in a separate operation, prior to closing the wellhead valve. This can result in significant delays that are undesirable, especially in time sensitive emergency operations.

In some embodiments, unspooling of a FO umbilical from a TPWT is advantageous due to a reduction of friction and drag on the FO umbilical during deployment of the TPWT in a wellbore. For example, in a situation in which a line extends from a spool at the surface and is attached to a device to be lowered into a wellbore, the line may be unspooled from the surface to lower the device into the wellbore. As a result, the line may move through the wellbore along with the device and rub against the abrasive walls of the wellbore. The resulting friction can physically wear the line and create a frictional force that resists advancement of the device in the wellbore. In an effort to address these issues, such a line may be provided with a durable exterior coating. Unfortunately, this can add weight and thickness to the line which can, in turn, limit a range of travel of the device or inhibit severing of the line. In contrast, unspooling of a FO umbilical from a TPWT as it travels through the wellbore may prevent significant movement of the FO umbilical within the wellbore. For example, a portion of a FO umbilical unspooled from a TPWT as it passes a given depth may remain at that depth as the TPWT continues to travel down the wellbore and unspool an additional length of the FO umbilical. During deployment, the FO umbilical may lay against the wall of the wellbore, but it should not experience any significant movement or rubbing along the wellbore. As a result, the FO umbilical may not generate friction that significantly resists advancement of the TPWT and may not require a durable exterior coating, which can help to reduce the weight and thickness of the FO umbilical. This can, in turn, extend a range of travel of the device or facilitate severing of the FO umbilical.

A TPWT can include various features that facilitate deployment in a hydrocarbon well. In some embodiments, a TPWT includes an integrated spool for housing a FO umbilical that is unspooled from the TPWT as it travels through a wellbore of a well. For example, a body of a TPWT may include a recess in an exterior surface of the body into which the FO umbilical can be wound. The integrated spool may provide for simple loading of the FO umbilical onto the TPWT, may protect the FO line during transport and travel in a wellbore environment, and may facilitate the unspooling of the FO umbilical during travel in the wellbore environment.

In some embodiments, a TPWT includes navigational elements, such as fins, rudders, or directional thrust systems. A fin of a TPWT may include a fixed stabilizer that reduces aerodynamic side slip of the TPWT. A rudder of a TPWT may include a movable stabilizer that provides for steering of the TPWT. A directional thrust system of a TPWT may include device for directing thrust generated by an engine of the TPWT. For example, a directional thrust system of a TPWT may include a gimbal mounted exhaust nozzle that can be swiveled to guide a direction of forward thrust generated by an engine of the TPWT. As a further example, a directional thrust system of a TPWT may include a reverse thrust system including a bypass conduit (or "passage") that can be selectively engaged to direct thrust generated by an engine of the TPWT in a forward direction. This may generate "reverse thrust" to slow or stop movement of the TPWT in the forward direction.

In some embodiments, a TPWT includes a jet-pump engine. A jet-pump engine of a TPWT may provide for the introduction of wellbore fluid into combusted gases of the engine to enhance the thrust generated by the TPWT. For example, a TPWT may include a jet-pump engine having a well fluid inlet that directs wellbore fluid into hot combusted gas prior to it being exhausted through an exit nozzle. The mixture of fluid and hot combusted gas may cause the wellbore fluid to expand, resulting in a relative increase in thrust for the amount of propellant combusted to generate the gas. This can help to decrease the amount of propellant needed or increase the effective range of the TPWT.

In some embodiments, a TPWT includes an integrated locating device, such as a casing collar locator (CCL). A CCL may include a device for sensing locations of transitions between adjacent sections of casing, tubing, or other conduit. For example, a TPWT may include a CCL including first and second electromagnetic coils integrated into a body of the TPWT. The coils may be electrified to create an electromagnet that is capable of sensing changes in magnetic field caused by changes in thickness of a surrounding metal tubular, such as casing or tubing. As the TPWT travels through a wellbore and passes a location at which a surrounding metal tubular changes in thickness, such as at a connection between adjacent sections of casing, the first and second electromagnetic coils can detect the change in magnetic field in sequence, and the change can be attributed to the TPWT being located at or passing the location of the change. The locations, such as locations of connections, are typically known for a well based on documentation of the construction of the well and, thus, the associated changes in magnetic flux can be used to determine a location of the TPWT in the wellbore of the well.

In some embodiments, a TPWT is used to deploy various types of sensors or other devices into a well. For example, a TPWT may include a payload of sensors, such as such as BHP sensors or BHT sensors. Deployment of the TPWT in a wellbore of a well may provide for positioning the sensors at a deployment location within the wellbore, where the sensors can be operated to acquire data, such as BHP data and BHT data, respectively, for the well.

In some embodiments, a TPWT is used to deploy sensors, such as a FO line, for distributed acoustic sensing (DAS). DAS may be used, for example, for vertical seismic profiling of a well. A DAS FO umbilical may include a FO line capable of sensing seismic events along its length. Such a DAS FO umbilical may be run into a wellbore of a well to distribute the FO line along a length of the wellbore where it can be operated to sense seismic events at discrete locations along the length of the wellbore. Seismic events can be generated, for example, by way of an array of seismic sources located at the surface that are operated to transmit seismic signals into a portion of a formation surrounding the wellbore. In some embodiments, a TPWT is spooled with a DAS FO umbilical that is unspooled for the TPWT as it travels in a wellbore of a well, in turn distributing a FO line along a length of the wellbore. The use of the TPWT may enable the DAS FO umbilical to be distributed deep into the wellbore with a relatively low amount of rubbing and wear of the DAS FO umbilical. In some embodiments, the DAS FO umbilical is sized to facilitate contact between the DAS FO umbilical and a lining of the wellbore, such as a metallic casing or tubing. For example, the DAS FO umbilical may have a length that is about 125% of a length portion of the wellbore to be lined to facilitate the DAS FO expanding radial to adhere (or "stick") to the tubular walls by way of surface tension. The extended length may promote the DAS FO umbilical taking a spiral or helical shape as it sticks to the interior walls. A resulting coupling with the walls of a tubular can help to reduce attenuation of seismic signals sensed by the DAS FO umbilical.

In some embodiments, a DAS FO umbilical includes a U-bend style DAS FO line. A U-bend DAS FO line may include a FO line having a first DAS FO line segment terminating into a FO U-bend that is coupled to a second DAS FO line segment. When deployed, the U-bend may be deposited down-hole, with the first and second DAS FO line segments extending to the surface. The ends of the first and second DAS FO line segments may be coupled to other U-bend DAS FO line segments deployed in other wells to provide a contiguous DAS FO line that extends into multiple wells. An interrogator may be coupled to the continuous DAS FO line to monitor seismic events sensed by the DAS FO line disposed in the well or wells.

In some embodiments, a U-bend of a DAS FO line includes a round bend in the DAS FO line connecting adjacent first and second segments of the DAS FO line. In some embodiments, a U-bend of a DAS FO line includes a "mini-bend" connection connecting adjacent first and second segments of the DAS FO line. In some embodiments, a U-bend DAS FO line is wrapped about an integrated spool of a TPWT to maintain the curved shape of the U-bend of the FO line. For example, a U-bend DAS FO line may be wrapped about a circumference of an integrated spool of a TPWT to maintain the curved shape of the U-bend of the FO line. As a further example, a U-bend DAS FO line may be wrapped about a circumference of an integrated spool of a TPWT with the U-bend secured to a face of the integrated spool (for example, tucked under wraps of the U-bend DAS FO line) to maintain the curved shape of the U-bend of the FO line. In an embodiment in which a U-bend DAS FO line includes a mini-bend, the U-bend DAS FO line may be wrapped about a circumference of an integrated spool of a TPWT, with the mini-bend secured to a face of the integrated spool (for example, tucked under wraps of the U-bend DAS FO line) to secure and protect the mini-bend of the FO line.

Provided in some embodiments is a method of deploying DAS sensors in a subterranean well. The method including: releasing a torpedo into gravity-driven advancement within a first portion of a wellbore of a subterranean well (the torpedo including: a DAS FO umbilical that is physically coupled to a surface component and adapted to unspool from the torpedo as the torpedo advances in the wellbore; and an engine adapted to generate thrust to propel advancement of the torpedo in the wellbore); determining that the torpedo has reached a trigger point within the wellbore; and activating, in response to determining that the torpedo has reached the trigger point within the wellbore, the engine to generate forward thrust to propel the torpedo within a horizontal portion of the wellbore such that at least some of the DAS FO umbilical is disposed in the horizontal portion of the wellbore, and the torpedo comes to rest at a deployment location within the wellbore.

Provided in some embodiments is a method of distributed acoustic sensing in a subterranean well, the method including: advancing a torpedo into a first portion of a wellbore of a subterranean well (the torpedo including: a DAS FO umbilical that is physically coupled to a surface component and adapted to unspool from the torpedo as the torpedo advances in the wellbore; and an engine adapted to generate thrust to propel the torpedo); and activating the engine to generate thrust to propel advancement of the torpedo within a second portion of the wellbore such that at least some of the DAS FO umbilical is disposed in the second portion of the wellbore.

In some embodiments, subsequent to the torpedo coming to rest in the deployment location, the DAS FO umbilical extends from the surface component into the second portion of the wellbore. In certain embodiments, the method further includes, subsequent to the torpedo coming to rest at the deployment location within the wellbore, conducting a seismic operation including sensing seismic events by way of the DAS FO umbilical unspooled in the wellbore. In some embodiments, the method further includes, positioning a plurality of seismic sources at surface locations, where the seismic operation further includes operating the seismic sources to generate seismic signals, and where the seismic events correspond to the seismic signals generated. In certain embodiments, the method further includes, subsequent to the torpedo coming to rest at the deployment location within the wellbore, conducting a fluid flow monitoring operation including sensing fluid flow by way of the DAS FO umbilical unspooled in the wellbore. In some embodiments, the method further includes, subsequent to the torpedo coming to rest at the deployment location within the wellbore, conducting a leak monitoring operation including sensing a leak by way of the integrated acoustic sensors of the DAS FO umbilical unspooled in the wellbore. In certain embodiments, the DAS FO umbilical includes a single segment of FO line. In some embodiments, the DAS FO line includes a U-bend style DAS FO line including a first segment of the DAS FO line and a second segment of the DAS FO line connected by way of a U-bend. In certain embodiments, the torpedo includes a cylindrical spool, and the method further includes wrapping the U-bend about a circumference of the spool, and wrapping the first and second segments of the DAS FO line about the U-bend wrapped about the circumference of the spool. In some embodiments, the torpedo includes a cylindrical spool, and the method further includes disposing the U-bend on a surface of the spool, and wrapping the first and second segments of the DAS FO line about the U-bend disposed on the surface of the spool. In certain embodiments, the U-bend includes a mini-bend connector. In some embodiments, a first portion of the DAS FO umbilical including the a first segment of the DAS FO, the second segment of the DAS FO line and the U-bend is disposed in the wellbore using the torpedo, and the method further includes deploying a second portion of the DAS FO umbilical into a second wellbore using a second torpedo, the second portion of the DAS FO umbilical including a third segment of the DAS FO line and a fourth segment of the DAS FO line connected by way of a second U-bend. In certain embodiments, the method further includes conducting a seismic operation including sensing seismic events by way of the first portion of the DAS FO umbilical disposed in the wellbore and the second portion of the DAS FO umbilical disposed in the second wellbore. In some embodiments, the torpedo includes a body formed of a dissolvable material adapted to dissolve in the wellbore, and the method further includes leaving the torpedo at the deployment location such that the body of the torpedo dissolves at the deployment location within the wellbore. In certain embodiments, the DAS FO umbilical is coupled to a well control system and is adapted to facilitate communication between the torpedo and the well control system, and the method further includes the well control system receiving data from the torpedo by way of the DAS FO umbilical. In some embodiments, the second portion of the wellbore includes a horizontal portion of the wellbore. In certain embodiments, the method further includes: determining that the torpedo has reached a trigger point within the wellbore, where the engine is activated to generate the thrust in response to determining that the torpedo has reached the trigger point within the wellbore. In some embodiments, the trigger point within the wellbore includes a predefined depth within the wellbore. In certain embodiments, the first portion of the wellbore includes a vertical portion of the wellbore and the second portion of the wellbore includes a horizontal portion of the wellbore, and the trigger point within the wellbore includes a point of transition between the vertical portion of the wellbore and the horizontal portion of the wellbore.

Provided in some embodiments is a non-transitory computer readable storage medium including program instructions stored thereon that are executable by a processor to cause the above described method operations.

Provided in some embodiments is a subterranean well torpedo system including: a control system; and a torpedo including: a DAS FO umbilical that is physically coupled to a surface component and adapted to unspool from the torpedo as the torpedo advances in the wellbore; and an engine adapted to generate thrust to propel the torpedo. The control system adapted to: advance the torpedo into a first portion of the wellbore of the subterranean well; and activate the engine to generate thrust to propel the torpedo within a second portion of the wellbore such that at least some of the DAS FO umbilical is disposed in the second portion of the wellbore.

In some embodiments, subsequent to the torpedo coming to rest in the deployment location, the DAS FO umbilical extends from the surface component into the second portion of the wellbore. In certain embodiments, the control system is further adapted to, subsequent to the torpedo coming to rest at the deployment location within the wellbore, conduct a seismic operation including sensing seismic events by way of the DAS FO umbilical unspooled in the wellbore. In some embodiments, a plurality of seismic sources are positioned at surface locations, and the seismic operation further includes operating the seismic sources to generate seismic signals, and where the seismic events correspond to the seismic signals generated. In certain embodiments, the control system is further adapted to, subsequent to the torpedo coming to rest at the deployment location within the wellbore, conduct a fluid flow monitoring operation including sensing fluid flow by way of the DAS FO umbilical unspooled in the wellbore. In some embodiments, the control system is further adapted to, subsequent to the torpedo coming to rest at the deployment location within the wellbore, conduct a leak monitoring operation including sensing a leak by way of the DAS FO umbilical unspooled in the wellbore. In certain embodiments, the DAS FO umbilical includes a single segment of FO line. In some embodiments, the DAS FO line includes a U-bend style DAS FO line including a first segment of the DAS FO line and a second segment of the DAS FO line connected by way of a U-bend. In certain embodiments, the torpedo includes a cylindrical spool, and where the U-bend is wrapped about a circumference of the spool, with the first and second segments of the DAS FO line wrapped about the U-bend wrapped about the circumference of the spool. In some embodiments, the torpedo includes a cylindrical spool, and where the U-bend is disposed on a surface of the spool, with the first and second segments of the DAS FO line wrapped about the U-bend disposed on the surface of the spool. In certain embodiments, the U-bend includes a mini-bend connector. In some embodiments, a first portion of the DAS FO umbilical includes the first segment of the DAS FO, the second segment of the DAS FO line and the U-bend, the first portion of the DAS FO line is disposed in the wellbore using the torpedo, and a second portion of the DAS FO umbilical is disposed in a second wellbore, the second portion of the DAS FO umbilical including a third segment of the DAS FO line and a fourth segment of the DAS FO line connected by way of a second U-bend. In certain embodiments, the control system is further adapted to conduct a seismic operation including sensing seismic events by way of the first portion of the DAS FO umbilical disposed in the wellbore and the second portion of the DAS FO umbilical disposed in the second wellbore. In some embodiments, the torpedo includes a body formed of a dissolvable material adapted to dissolve in the wellbore. In certain embodiments, the DAS FO umbilical is coupled to a well control system and is adapted to facilitate communication between the torpedo and the well control system. In some embodiments, the second portion of the wellbore includes a horizontal portion of the wellbore. In certain embodiments, the control system is further adapted to determine that the torpedo has reached a trigger point within the wellbore, and the engine is activated to generate the thrust in response to determining that the torpedo has reached the trigger point within the wellbore. In some embodiments, the trigger point within the wellbore includes a predefined depth within the wellbore. In certain embodiments, the first portion of the wellbore includes a vertical portion of the wellbore and the second portion of the wellbore includes a horizontal portion of the wellbore, and the trigger point within the wellbore includes a point of transition between the first wellbore portion and the second wellbore portion of the wellbore. In some embodiments, the DAS FO umbilical has a length that is at least 25% greater than a distance between the surface component and a target deployment location within the wellbore.

Figure 1:
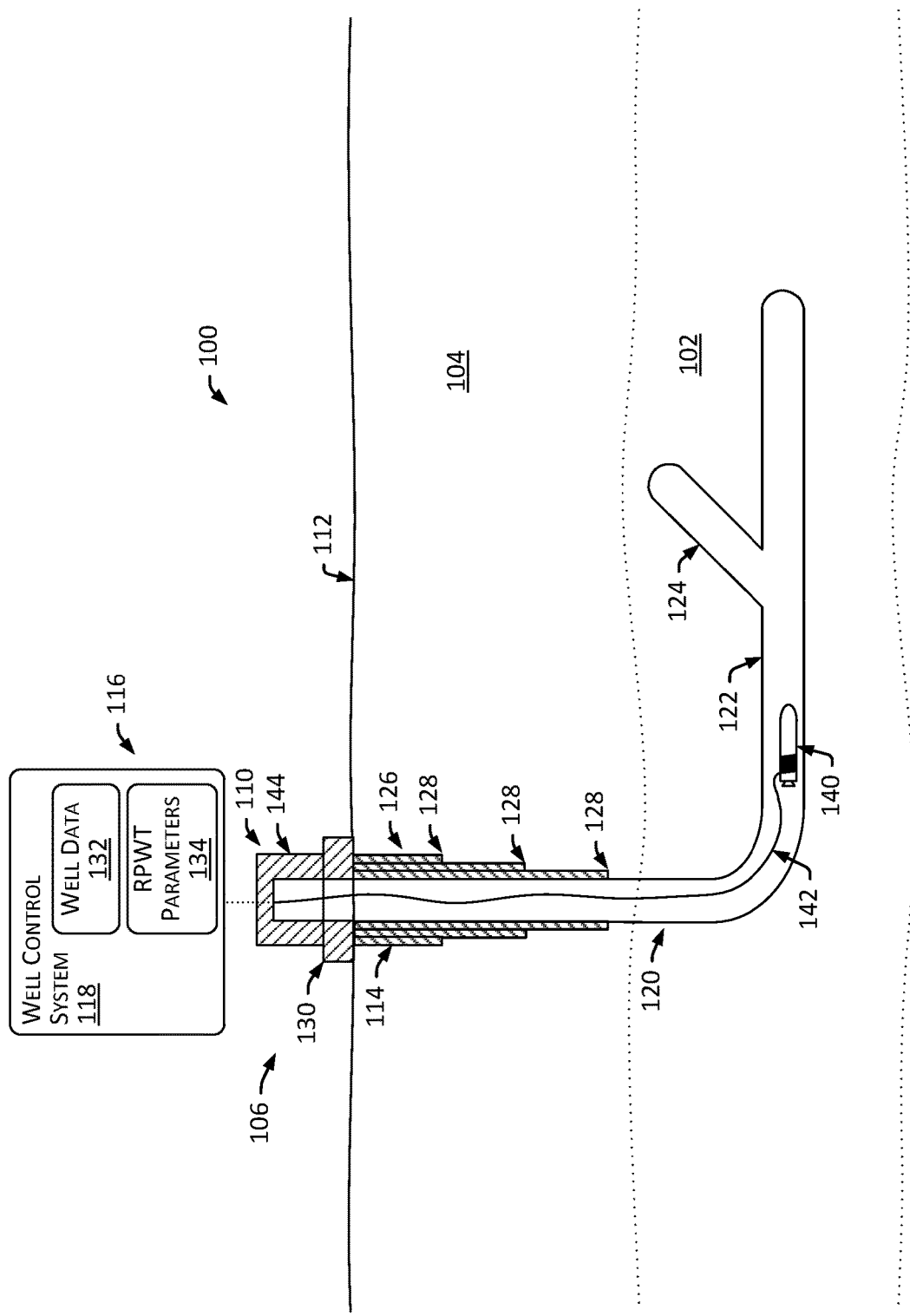
FIG. 1 is diagram that illustrates a well environment in accordance with one or more embodiments.

While this disclosure is susceptible to various modifications and alternative forms, specific embodiments are shown by way of example in the drawings and will be described in detail. The drawings may not be to scale. It should be understood that the drawings and the detailed description are not intended to limit the disclosure to the particular form described, but are intended to disclose modifications, equivalents and alternatives falling within the scope of the present disclosure as defined by the claims.

DETAILED DESCRIPTION

Described are embodiments of novel systems and methods for deploying devices into wells (e.g., a hydrocarbon well) by way of a thrust-propelled well torpedo (TPWT) system. In some embodiments, a TPWT system is employed to deploy devices, such as sensors, into a wellbore of a hydrocarbon well, such as an oil well. For example, a TPWT having an engine and carrying a payload, such as sensors or other devices, may be propelled deep into a wellbore of a hydrocarbon well by way of thrust-based propulsion.

In some embodiments, a TPWT includes a fiber optic (FO) umbilical that is unspooled from the TPWT as it travels in a wellbore. For example, a TPWT may include a FO umbilical including a FO line that is wrapped (or "spooled") around an integrated spool of the TPWT, and that is unspooled from the TPWT as it travels through the wellbore. An FO umbilical may provide for communication between the TPWT and a control system, such as a well control system located at the surface. For example, an upper end (or "up-hole end") of a FO umbilical of a TPWT may be coupled to a well control system of a well, and a lower end (or "down-hole end") of the FO umbilical may be coupled to a control system (or "controller") of the TPWT. In such an embodiment, the FO umbilical may provide for communication of data between the well control system and the control system of the TPWT.

In some embodiments, the data includes commands relating to controlling operation of the TPWT. For example, the well control system may send, to the controller of the TPWT by way of the FO umbilical, commands dictating operation of the TPWT. In such an embodiment, the controller may execute the commands by controlling corresponding operations of the TPWT. For example, the well control system may send, to the controller of the TPWT by way of the FO umbilical, a command to ignite or extinguish the engine of the TPWT, and the controller may control a fuel supply valve and an igniter of the engine to ignite the engine. In some embodiments, the data includes TPWT operational data relating to operation of the TPWT. For example, the controller of the TPWT may monitor and collect data regarding the operation of the engine, the controller or the payload, such as conditions sensed by sensors of the payload, and send, to the well control system by way of the FO umbilical, TPWT operational data corresponding to the data collected. The TPWT data may, for example, include data that indicates whether the engine is ignited, that indicates a status of fins, rudders or directional thrust systems of the TPWT, that indicates a speed, orientation or location of the TPWT within the wellbore, or that indicates conditions sensed by the sensors. In some embodiments, the well control system generates the commands relating to controlling operation of the TPWT based on the TPWT operational data received from the TPWT controller.

In some embodiments, deployment of a TPWT in a wellbore includes a gravity-driven free-fall of the TPWT in the wellbore, followed by a thrust-driven propulsion of the TPWT further into the wellbore. For example, a TPWT may be released into a free-fall through a first/upper portion of the wellbore (such as a vertical portion of the wellbore) and, upon reaching a trigger point (such as a predefined depth in the wellbore), the engine of the TPWT may be ignited to generate thrust that propels the TPWT in a second/lower portion of the wellbore (such as a horizontal portion of the wellbore). The TPWT may come to rest in a deployment location in the second/lower portion of the wellbore.

In some embodiments, a body of a TPWT is formed of a material adapted to dissolve under exposure to a wellbore environment. The material may include, for example, a magnesium alloy. In such an embodiment, the TPWT may come to rest in a deployment location within the wellbore, and the dissolvable body of the TPWT may dissolve (for example, over the course of several hours, days or weeks), leaving behind the FO umbilical and any non-dissolvable portions of the TPWT, such as a payload of non-dissolvable sensors.

In some embodiments, the use of a dissolvable TPWT body is advantageous. For example, a dissolvable TPWT body can eliminate a need to retrieve the TPWT. Traditional wireline devices are typically lowered into a wellbore and later retrieved (for example, pulled) from the wellbore for reuse or to keep the wireline device from blocking the wellbore. In contrast, a dissolvable TPWT body may be less expensive to produce, eliminating a need for reuse, and may simply dissolve to reduce any blockage of the wellbore. As a result, use of a dissolvable TPWT body can eliminate the need for a retrieval operation, or at least simplify any associated retrieval operation. A retrieval operation, if conducted, may simply include pulling the relatively thin and light FO umbilical and any non-dissolvable portions of the TPWT that remain coupled to the FO umbilical, such as undissolved sensors. Moreover, given that the body of the TPWT may not need to be retrieved, the FO umbilical can be relatively thin and lightweight, which can be advantageous for at least the reasons described here, including extending a range of the TPWT, or facilitating severing of the FO umbilical, if needed.

In some embodiments, use of a FO umbilical is advantageous. For example, in contrast to a relatively heavy line, such as a traditional wireline umbilical, a FO umbilical may have a relatively light weight. This may help to reduce the overall weight of a TPWT, which can enable the TPWT to travel farther into the wellbore or to carry a heavier payload. As a further example, in contrast to a relatively thick line, such as a traditional wireline umbilical, a FO umbilical may have a relatively small diameter and can be severed easily. This may enable a FO umbilical to be run through relatively small ports in the well system, such as through a valve of a wellhead, and may enable the FO umbilical to be easily severed if needed. For example, in the case of an emergency operation that requires closing of a wellhead valve having a FO umbilical run through the valve, the valve can simply be closed, with the closing action severing the FO umbilical. In contrast, a traditional wireline may be too thick or tough to be easily severed by a wellhead valve. Thus, the wireline may need to be removed from the wellbore or severed in a separate operation, prior to closing the wellhead valve. This can result in significant delays that are undesirable, especially in time sensitive emergency operations.

In some embodiments, unspooling of a FO umbilical from a TPWT is advantageous due to a reduction of friction and drag on the FO umbilical during deployment of the TPWT in a wellbore. For example, in a situation in which a line extends from a spool at the surface and is attached to a device to be lowered into a wellbore, the line may be unspooled from the surface to lower the device into the wellbore. As a result, the line may move through the wellbore along with the device and rub against the abrasive walls of the wellbore. The resulting friction can physically wear the line and create a frictional force that resists advancement of the device in the wellbore. In an effort to address these issues, such a line may be provided with a durable exterior coating. Unfortunately, this can add weight and thickness to the line which can, in turn, limit a range of travel of the device or inhibit severing of the line. In contrast, unspooling of a FO umbilical from a TPWT as it travels through the wellbore may prevent significant movement of the FO umbilical within the wellbore. For example, a portion of a FO umbilical unspooled from a TPWT as it passes a given depth may remain at that depth as the TPWT continues to travel down the wellbore and unspool an additional length of the FO umbilical. During deployment, the FO umbilical may lay against the wall of the wellbore, but it should not experience any significant movement or rubbing along the wellbore. As a result, the FO umbilical may not generate friction that significantly resists advancement of the TPWT and may not require a durable exterior coating, which can help to reduce the weight and thickness of the FO umbilical. This can, in turn, extend a range of travel of the device or facilitate severing of the FO umbilical.

A TPWT can include various features that facilitate deployment in a hydrocarbon well. In some embodiments, a TPWT includes an integrated spool for housing a FO umbilical that is unspooled from the TPWT as it travels through a wellbore of a well. For example, a body of a TPWT may include a recess in an exterior surface of the body into which the FO umbilical can be wound. The integrated spool may provide for simple loading of the FO umbilical onto the TPWT, may protect the FO line during transport and travel in a wellbore environment, and may facilitate the unspooling of the FO umbilical during travel in the wellbore environment.

In some embodiments, a TPWT includes navigational elements, such as fins, rudders, or directional thrust systems. A fin of a TPWT may include a fixed stabilizer that reduces aerodynamic side slip of the TPWT. A rudder of a TPWT may include a movable stabilizer that provides for steering of the TPWT. A directional thrust system of a TPWT may include device for directing thrust generated by an engine of the TPWT. For example, a directional thrust system of a TPWT may include a gimbal mounted exhaust nozzle that can be swiveled to guide a direction of forward thrust generated by an engine of the TPWT. As a further example, a directional thrust system of a TPWT may include a reverse thrust system including a bypass conduit (or "passage") that can be selectively engaged to direct thrust generated by an engine of the TPWT in a forward direction. This may generate "reverse thrust" to slow or stop movement of the TPWT in the forward direction.

In some embodiments, a TPWT includes a jet-pump engine. A jet-pump engine of a TPWT may provide for the introduction of wellbore fluid into combusted gases of the engine to enhance the thrust generated by the TPWT. For example, a TPWT may include a jet-pump engine having a well fluid inlet that directs wellbore fluid into hot combusted gas prior to it being exhausted through an exit nozzle. The mixture of fluid and hot combusted gas may cause the wellbore fluid to expand, resulting in a relative increase in thrust for the amount of propellant combusted to generate the gas. This can help to decrease the amount of propellant needed or increase the effective range of the TPWT.

In some embodiments, a TPWT includes an integrated locating device, such as a casing collar locator (CCL). A CCL may include a device for sensing locations of transitions between adjacent sections of casing, tubing, or other conduit. For example, a TPWT may include a CCL including first and second electromagnetic coils integrated into a body of the TPWT. The coils may be electrified to create an electromagnet that is capable of sensing changes in magnetic field caused by changes in thickness of a surrounding metal tubular, such as casing or tubing. As the TPWT travels through a wellbore and passes a location at which a surrounding metal tubular changes in thickness, such as at a connection between adjacent sections of casing, the first and second electromagnetic coils can detect the change in magnetic field in sequence, and the change can be attributed to the TPWT being located at or passing the location of the change. The locations, such as locations of connections, are typically known for a well based on documentation of the construction of the well and, thus, the associated changes in magnetic flux can be used to determine a location of the TPWT in the wellbore of the well.

In some embodiments, a TPWT is used to deploy various types of sensors or other devices into a well. For example, a TPWT may include a payload of sensors, such as such as BHP sensors or BHT sensors. Deployment of the TPWT in a wellbore of a well may provide for positioning the sensors at a deployment location within the wellbore, where the sensors can be operated to acquire data, such as BHP data and BHT data, respectively, for the well.

In some embodiments, a TPWT is used to deploy sensors, such as a FO line, for distributed acoustic sensing (DAS). DAS may be used, for example, for vertical seismic profiling of a well. A DAS FO umbilical may include a FO line capable of sensing seismic events along its length. Such a DAS FO umbilical may be run into a wellbore of a well to distribute the FO line along a length of the wellbore where it can be used to sense seismic events at discrete locations along the length of the wellbore. Seismic event can be generated, for example, by way of an array of seismic sources located at the surface that are operated to transmit seismic signals into a portion of a formation surrounding the wellbore. In some embodiments, a TPWT is spooled with a DAS FO umbilical that is unspooled for the TPWT as it travels in a wellbore of a well, in turn distributing the FO line along a length of the wellbore. The use of the TPWT may enable the DAS FO umbilical to be distributed deep into the wellbore with a relatively low amount of rubbing and wear of the DAS FO umbilical. In some embodiments, the DAS FO umbilical is sized to facilitate contact between the DAS FO umbilical and a lining of the wellbore, such as a metallic casing or tubing. For example, the DAS FO umbilical may have a length that is about 125% of a length portion of the wellbore to be lined to facilitate the DAS FO expanding radial to adhere (or "stick") to the tubular walls by way of surface tension. The extended length may promote the DAS FO umbilical taking a spiral or helical shape as it sticks to the interior walls. A resulting coupling with the walls of a tubular can help to reduce attenuation of seismic signals sensed by the DAS FO umbilical.

In some embodiments, a DAS FO umbilical includes a U-bend style DAS FO line. A U-bend DAS FO line may include a FO line having a first DAS FO line segment terminating into a FO U-bend that is coupled to a second DAS FO line segment. When deployed, the U-bend may be deposited down-hole, with the first and second DAS FO line segments extending to the surface. The ends of the first and second DAS FO line segments may be coupled to other U-bend DAS FO line segments deployed in other wells to provide a contiguous DAS FO line that extends into multiple wells. An interrogator may be coupled to the continuous DAS FO line to monitor seismic events sensed by the DAS FO line disposed in the well or wells.

In some embodiments, a U-bend of a DAS FO line includes a round bend in the DAS FO line connecting adjacent first and second segments of the DAS FO line. In some embodiments, a U-bend of a DAS FO line includes a "mini-bend" connection connecting adjacent first and second segments of the DAS FO line. In some embodiments, a U-bend DAS FO line is wrapped about an integrated spool of a TPWT to maintain the curved shape of the U-bend of the FO line. For example, a U-bend DAS FO line may be wrapped about a circumference of an integrated spool of a TPWT to maintain the curved shape of the U-bend of the FO line. As a further example, a U-bend DAS FO line may be wrapped about a circumference of an integrated spool of a TPWT with the U-bend secured to a face of the integrated spool (for example, tucked under wraps of the U-bend DAS FO line) to maintain the curved shape of the U-bend of the FO line. In an embodiment in which a U-bend DAS FO line includes a mini-bend, the U-bend DAS FO line may be wrapped about a circumference of an integrated spool of a TPWT, with the mini-bend secured to a face of the integrated spool (for example, tucked under wraps of the U-bend DAS FO line) to secure and protect the mini-bend of the FO line.

Although certain embodiments are described with regard to a hydrocarbon well for the purpose of illustration, embodiments can be employed in other types of subterranean wells, such as water wells.

FIG. 1 is a diagram that illustrates a well environment 100 in accordance with one or more embodiments. In the illustrated embodiment, the well environment 100 includes a reservoir ("reservoir") 102 located in a subsurface formation ("formation") 104, and a well system ("well system") 106. In some embodiments, the well system 106 includes a TPWT system 110. As described here, in some embodiments, the TPWT system 110 is employed to deploy devices, such as BHT sensors, BHP sensors or DAS sensors, into a wellbore of the well system 106.

The formation 104 may include a porous or fractured rock formation that resides underground, beneath the Earth's surface ("surface") 112. The reservoir 102 may be a hydrocarbon reservoir defined by a portion of the formation 104 that contains (or that is at least determined to contain or expected to contain) a subsurface pool of hydrocarbons, such as oil and gas. The formation 104 and the reservoir 102 may each include different layers of rock having varying characteristics, such as varying degrees of permeability, porosity, and fluid saturation. In the case of the well system 106 being operated as a production well, the well system 106 may facilitate the extraction of hydrocarbons (or "production") from the reservoir 102. In the case of the well system 106 being operated as an injection well, the well system 106 may facilitate the injection of substances, such as water or gas, into the formation 104 or the reservoir 102. In the case of the well system 106 being operated as a monitoring well, the well system 106 may facilitate the monitoring of various characteristics of the formation 104 or the reservoir 102, such reservoir pressure.

The well system 106 may include a hydrocarbon well (or "well") 114 and a well operating system 116. The well operating system 116 may include components for developing and operating the well 114, including a well control system 118 and the TPWT system 110. The well control system 118 may control various operation aspects of the well system 106, such as well drilling operations, well completion operations, well production operations or well and formation monitoring operations. As described, in some embodiments, the well control system 118 controls operation of the TPWT system 110 to deploy devices, such as BHT sensors, BHP sensors or DAS sensors, into a wellbore of the well 114. In some embodiments, the well control system 118 includes a computer system that is the same as or similar to that of computer system 2000 described with regard to at least FIG. 15.

The well 114 may include a wellbore (or "borehole") 120. The wellbore 120 may include a bored hole that extends from the surface 112 into a target zone of the formation 104, such as the reservoir 102. An upper end of the wellbore 120, at or near the surface 112, may be referred to as the "up-hole" end of the wellbore 120. A lower end of the wellbore 120, terminating in the formation 104, may be referred to as the "down-hole" end of the wellbore 120. The wellbore 120 may be created, for example, by a drill bit boring through the formation 104 and the reservoir 102. The wellbore 120 may provide for the circulation of drilling fluids during drilling operations, the flow of hydrocarbons, such as oil or gas, from the reservoir 102 to the surface 112 during production operations, the injection of substances, such as water or gas, into the formation 104 or the reservoir 102 during injection operations, or the communication of monitoring devices, such as sensors or logging tools, into one or both of the formation 104 and the reservoir 102 during monitoring operations, such as in-situ sensing or logging operations. The wellbore 120 may include a motherbore 122 and one or more lateral bores 124.

The well 114 may include completion elements installed in the wellbore 120, such as casing 126. The casing 126 may include, for example, tubular sections of steel casing pipe lining an inside diameter of the wellbore 120. In some embodiments, the casing 126 includes a filler material, such as casing cement, deposited in the annular region located between the exterior of the casing pipe of the casing 126 and the walls of the wellbore 120. In some embodiments, the casing 126 includes casing collars 128 defined by variations in the thickness of the casing pipe or joints between adjacent sections of casing pipe that form the casing 126. As described, the casing collars 128, or collars of other elements disposed in the wellbore 120, may be detectable by a casing collar locator (CCL) device as it is passed through the wellbore 120. Portions of the wellbore 120 having casing 126 installed may be referred to as a "cased" portions of the wellbore 120. Portions of the wellbore 120 not having casing 126 installed may be referred to as an "open-holed" or "un-cased" portions of the wellbore 120. For example, in the illustrated embodiment, the upper portion of the wellbore 120 having casing 126 installed may be referred to as a "cased" portion of the wellbore 120, and the lower portion of the wellbore 120 below (or "down-hole" from) a lower end of the casing 126 may be referred to as an "un-cased" (or "open-holed") portion of the wellbore 120. In some embodiments, "down-hole" devices are positioned in the wellbore 120 to monitor conditions in the wellbore 120 or to perform operations in the wellbore 120. For example, BHP sensors and BHT sensors may be disposed in the wellbore 120 to measure BHP and BHT in the wellbore 120.

The well 114 may include surface components, such as a wellhead 130. The wellhead 130 may include a device provided at an up-hole end of the wellbore 120 to provide a structural and pressure-containing interface between the wellbore 120 and drilling and production equipment of the well system 106. For example, the wellhead 130 may include a structure having a passage that provides access to the wellbore 120 and that supports the weight of the casing 126 or other down-hole components suspended in the wellbore 120. The wellhead 130 may include seals and valves that regulate access to the wellbore 120. During drilling operations, a blowout preventer may be coupled to the wellhead 130 to control pressure in the wellbore 120. During production operations, a production tree may be coupled to the wellhead 130 to control production flow rates and pressure. As described here, in some embodiments, a TPWT tree cap is coupled to the wellhead 130 to facilitate deployment of a TPWT into the wellbore 120.

In some embodiments, the well control system 118 stores, or otherwise has access to, well data 132. The well data 132 may include data that is indicative of various characteristics of the well 114, the formation 104 or the reservoir 102. The well data 132 may include, for example, a well location, a well trajectory, well logs, or well and formation characteristics. A well location may include coordinates defining a location at which the up-hole end of the wellbore 120 penetrates the Earth's surface 112. A well trajectory for a well may include coordinates defining a path of a wellbore of the well. For example, a well trajectory for the wellbore 120 of FIG. 1 may include coordinates of a path of the motherbore 122 and the lateral bore 124. In some embodiments, the well data 132 for a well includes casing collar locations defining the depths at which casing collars are located in the wellbore of the well.

In some embodiments, the well control system 118 stores, or otherwise has access to, TPWT parameters 134. The TPWT parameters 134 may, for example, specify parameters for deploying a TPWT into the wellbore 120 of the well 114. In some embodiments, the TPWT parameters 134 specify a predefined trigger point. The trigger point may define a location, such as a depth in the wellbore 120 or a time after release into a free-fall, at which a TPWT should transition from a free-fall to propelled operation. In some embodiments, the TPWT parameters 134 specify a predefined route. The route may define a path within the wellbore 120, such as a path through the vertical section of the motherbore 122 and extending into a horizontal section of the motherbore 122 or the lateral 124, to be traversed by a TPWT in the wellbore 120. The TPWT parameters 134 may be predefined, for example, by a well operator.

In some embodiments, the TPWT system 110 includes a thrust-propelled torpedo (TPWT) 140, a TPWT umbilical ("umbilical") 142 and a TPWT tree cap ("tree cap") 144. As described, the TPWT system 110 may be employed to deploy devices, such as BHT sensors, BHP sensors or DAS sensors, into the wellbore 120 of the well 114. In some embodiments, the umbilical 142 is a fiber optic (FO) umbilical formed of a FO line. The FO line may provide for FO communication of data between the TPWT 140 and the well control system 118. In some embodiments, the umbilical 142 does not include a conduit for the transfer of electrical power. For example, the umbilical 142 may not provide for the communication of operational power from the well control system 118 to the TPWT 140. As described, in some embodiments, the umbilical 142 includes a DAS FO line capable of sensing seismic events along a length of the DAS FO line, and deployment of the umbilical into the well 114 using the TPWT 140 may provide for positioning of the FO line along a length of the wellbore 120 of the well 114.

Figure 2:
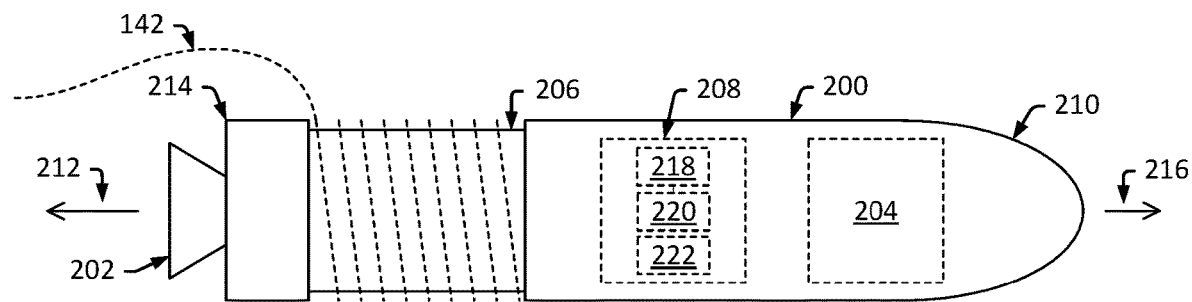
FIG. 2 is a diagram that illustrates a thrust-propelled well torpedo (TPWT) in accordance with one or more embodiments.

FIG. 2 is a diagram that illustrates a TPWT 140 in accordance with one or more embodiments. In some embodiments, the TPWT 140 includes a TPWT body ("body") 200, a TPWT engine ("engine") 202, a TPWT payload ("payload") 204, an integrated TPWT spool ("spool") 206, and a TPWT controller 208. The engine 202 may include a solid propellant driven engine that is operable to generate thrust that propels advancement of the TPWT 140 in the wellbore 120. The thrust may be generated, for example, by a jet of gas or liquid that is expelled from the engine 202. In some embodiments, such a jet may be expelled in a backward direction to generate forward thrust that provides for forward advancement of the TPWT 140 (for example, advancement toward a down-hole end of the wellbore 120). In some embodiments, some or all of the jet may be directed in forward direction to generate reverse thrust that regulates forward advancement of the TPWT 140, or that causes the TPWT 140 to move in a reverse direction (for example, movement "backward" toward an up-hole end of the wellbore 120). The payload 204 may include various types of devices, such as such as BHP sensors or BHT sensors. In some embodiments, the umbilical 142 is the payload 204. For example, where it is desirable to deploy a DAS FO line into the wellbore 120, the DAS FO line may serve as the umbilical 142 and be the payload 204.

The TPWT controller 208 may provide for monitoring and controlling operation of the TPWT 140 or communicating with devices external to the TPWT 140, such as the well control system 118. In some embodiments, the TPWT controller 208 includes a processor 218, memory 220, and a local power source 222. The local power source 222 may be, for example, a battery. The local power source 222 may supply power for operating the controller 208 or other devices of the TPWT 140, such as sensors, valves, igniters, navigational elements or the payload 204.

In some embodiments, the TPWT controller 208 may monitor the status of various elements of the TPWT 140. For example, the TPWT controller 208 may monitor the operational status of the engine 202, of navigational elements of the TPWT 140 (such as the position of stabilizers and a reverse thrust system), of sensors of the TPWT 140 (such as a CCL), or of the payload 204 of the TPWT 140 (such as BHP sensors or BHT sensors). The controller 208 may transmit corresponding TPWT operational data to the well control system 118 by way of the umbilical 142.

In some embodiments, the TPWT controller 208 may control operational aspects of the TPWT 140. For example, the TPWT controller 208 may receive commands relating to controlling operation of the TPWT 140, and may execute the commands by controlling corresponding operations of the TPWT 140. The commands may be received from the well control system 118 by way of the umbilical 142. In some embodiments, the TPWT controller 208 includes a computer system that is the same as or similar to that of computer system 2000 described with regard to at least FIG. 15. Although some embodiments are described with regard to the well control system 118 sending commands and the TPWT controller 208 executing the commands and reporting operational data to the well control system 118, embodiments can include the TPWT controller 208 executing operational tasks independent of the well control system 118. For example, the TPWT controller 208 may process the TPWT operational data locally to determine a status of the TPWT 140 and a corresponding operational task, and may, in turn, control operation of the TPWT 140 to execute the task. For example, upon the controller 208 determining that the TPWT 140 has reached a target point in the wellbore 120, the TPWT 140 may initiate ignition of the engine 202.

In some embodiments, the body 200 of the TPWT 140 is formed of a material adapted to dissolve under exposure to a wellbore environment. The body 200 may, for example, be formed of a magnesium alloy that is expected to dissolve in the wellbore 120. In such an embodiment, the TPWT 140 may come to rest in a deployment location within the wellbore 120, and the dissolvable body 200 of the TPWT 140 may dissolve (for example, over the course of several hours, days or weeks), leaving behind the umbilical 142 and any non-dissolvable portions of the TPWT 140, such as the payload 204 or the controller 208, at the deployment location.

In some embodiments, the body 200 is cylindrical in shape, having a cone shaped leading end (or "nose") 210. Thrust generated by the engine 202 may be expelled backward (in the direction of arrow 212), from a trailing end (or "tail end") 214 of the body 200, to generate forward thrust to propel the TPWT 140 forward (in the direction of arrow 216). For example, combusted gas generated by the engine 202 may be expelled backward, through an exit nozzle of the engine 202 located at the tail of the body 200 to generate forward thrust to propel the TPWT 140 forward (for example, toward a down-hole end of the wellbore 120). In some embodiments, some or all of the thrust generated by the engine 202 is selectively expelled forward (in the direction of arrow 216), from the leading end 210 of the body 200, to generate reverse thrust to slow or stop forward advancement of the TPWT 140. For example, at least some of the combusted gas generated by the engine 202 may be expelled in a forward direction to generate reverse thrust to slow or stop forward advancement of the TPWT 140. The amount of forward or reverse thrust may be controlled to regulate the speed of the TPWT 140 or to cause the TPWT to come to rest at or near a given deployment location in the wellbore 120. In some embodiments, the reverse thrust may be of a sufficient magnitude to cause the TPWT 140 to move in reverse (for example, to move "backward" toward an up-hole end of the wellbore 120).

In some embodiments, the spool 206 provides a location for housing the umbilical 142 at the TPWT 140. The spool 206 may enable the umbilical 142 to be unspooled from the TPWT 140 as the TPWT 140 travels through the wellbore 120 of the well 114. For example, the spool 206 may include a circumferential depression (or "recess") that extends along a length of an exterior of the cylindrical body 200. The umbilical 142 may be wound onto the spool 206 (for example, the umbilical may be wound about the body 200, in the recess) with an up-hole end of the umbilical 142 physically coupled to a surface component, such as the TPWT tree cap 144. During a deployment of the TPWT 140 into the wellbore 120, the umbilical 142 may be unwound (or "unspooled") from the spool 206 as the TPWT 140 advances down the wellbore 120. In some embodiments, the recess of the spool 206 is of sufficient depth such that windings of the umbilical 142 loaded onto the spool 206 do not protrude radially outward from the recess. Such a spool 206 may provide for simple loading of the umbilical 142 onto the TPWT 140, may protect the umbilical 142 during assembly and transport of the TPWT 140 and during travel of the TPWT 140 in the wellbore 120, and may facilitate simple unspooling of the umbilical 142 from the TPWT 140 in the wellbore 120.

In a deployment operation, the umbilical 142 may be spooled onto the spool 206 of the TPWT 140, an upper end of the umbilical 142 may be attached to the tree cap 144, and the TPWT 140 may be advanced in the wellbore 120 to a deployment location in a down-hole portion of the wellbore 120, with the umbilical 142 being unspooled from the spool 206 as the TPWT 140 is advanced in the wellbore 120. In some embodiments, advancement of the TPWT 140 includes a gravity-driven free-fall of the TPWT 140 in the wellbore 120, followed by thrust-driven propulsion of the TPWT 140 that advances the TPWT 140 further into the wellbore 120. For example, the TPWT 140 may be released into a free-fall through a first/upper portion of the wellbore 120 (such as a vertical portion of the wellbore 120) and, upon reaching a trigger point (such as a predefined depth in the wellbore 120), the engine 202 of the TPWT 140 may be ignited to generate thrust that propels the TPWT 140 into a second/lower portion of the wellbore 120 (such as a horizontal portion of the wellbore 120). The TPWT 140 may come to rest in a deployment location, for example, in a down-hole end of the second/lower portion of the wellbore 120. The TPWT 140 may come to rest in the deployment location, for example, based on controlling the thrust to slow or stop advancement of the TPWT 140 at the deployment location, or the TPWT 140 running out its fuel source.

During operation, a controller may control operation of the TPWT 140. For example, the controller 208 may control ignition and operation of the engine 202 or other navigational elements, such as fins, rudders or directional thrust systems, to "fly" the TPWT 140 through the wellbore 120. In some embodiments, the controller 208 may control operation of the TPWT 140 based on commands received from the well control system 118 by way of the umbilical 142.

Figure 3:
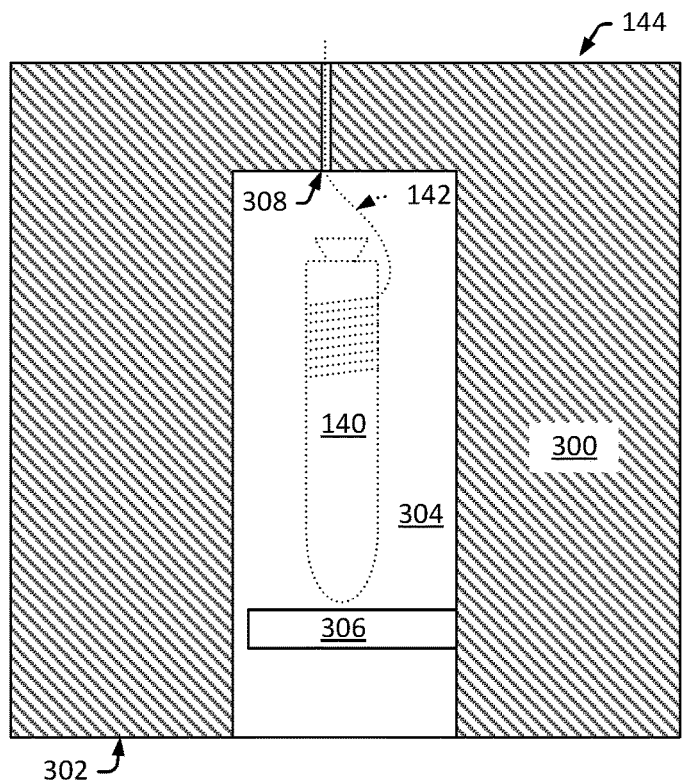
FIG. 3 is a diagram that illustrates a TPWT tree cap in accordance with one or more embodiments.

FIG. 3 is a diagram that illustrates a TPWT tree cap 144 in accordance with one or more embodiments. In some embodiments, the tree cap 144 includes a TPWT tree cap body ("tree cap body") 300 having a TPWT tree cap sealing flange ("tree cap sealing flange") 302 and defining a TPWT tree cap chamber ("tree cap chamber") 304, a TPWT retainer 306, and a TPWT tree cap communication port ("tree cap communication port") 308. The tree cap sealing flange 302 may provide sealing engagement with complementary components, such as a sealing flange of the wellhead 130. The tree cap chamber 304 may include a void sized to house a TPWT 140. The tree cap communication port 308 may include a port, such as a sealed bulkhead connector, that provides for communicatively coupling an umbilical 142 of the TPWT 140 to an external communications device, such as the well control system 118. The sealing nature of the tree cap sealing flange 302 and the tree cap communication port 308 may enable the tree cap chamber 304 to contain high pressure, such as when the TPWT tree cap 144 is assembled to the wellhead 130 and a valve of the wellhead 130 is opened to expose the tree cap chamber 304 to pressure of the wellbore 120. The TPWT retainer 306 may include a device adapted to retain a TPWT 140 within the tree cap chamber 304. For example, the TPWT retainer 306 may include a pin, a door or a valve, that can be moved to a closed (or "retain") position to retain the a TPWT 140 within the tree cap chamber 304 and that can be moved to an open (or "release") position to release the TPWT 140 from the tree cap 144, allowing the TPWT 140 to fall from, or otherwise exit, the tree cap chamber 304. As described, in a deployment operation, an "loaded" TPWT 140 (having the umbilical 142 spooled onto a spool 206 of the TPWT 140) may be inserted into the tree cap chamber 304, an upper end of the umbilical 142 may be coupled to the tree cap communication port 308 at an upper end of the tree cap chamber 304, the TPWT retainer 306 may be moved into a closed position to retain the TPWT 140 within the tree cap chamber 304, the "loaded" TPWT tree cap 144 (including the TPWT 140 retained within the tree cap chamber 304) may be assembled to a wellhead 130 such that the tree cap sealing flange 302 seals with a complementary sealing flange of the wellhead 130, a valve of the wellhead 130 may be opened to expose the tree cap chamber 304 to conditions of the wellbore 120 (including wellbore pressure), and, after confirming that no leaks are present in the chamber 304 or at the tree cap sealing flange 302, the TPWT retainer 306 may be moved to an open position to release the TPWT 140 from the tree cap chamber 304, through a passage of the wellhead 130 and into the wellbore 120. Communication between the TPWT 140 and the well control system 118 may be provided, before, during or after advancement of the TPWT 140 through the wellbore 120, by way of the umbilical 142 and the tree cap communication port 308.

Figure 4:
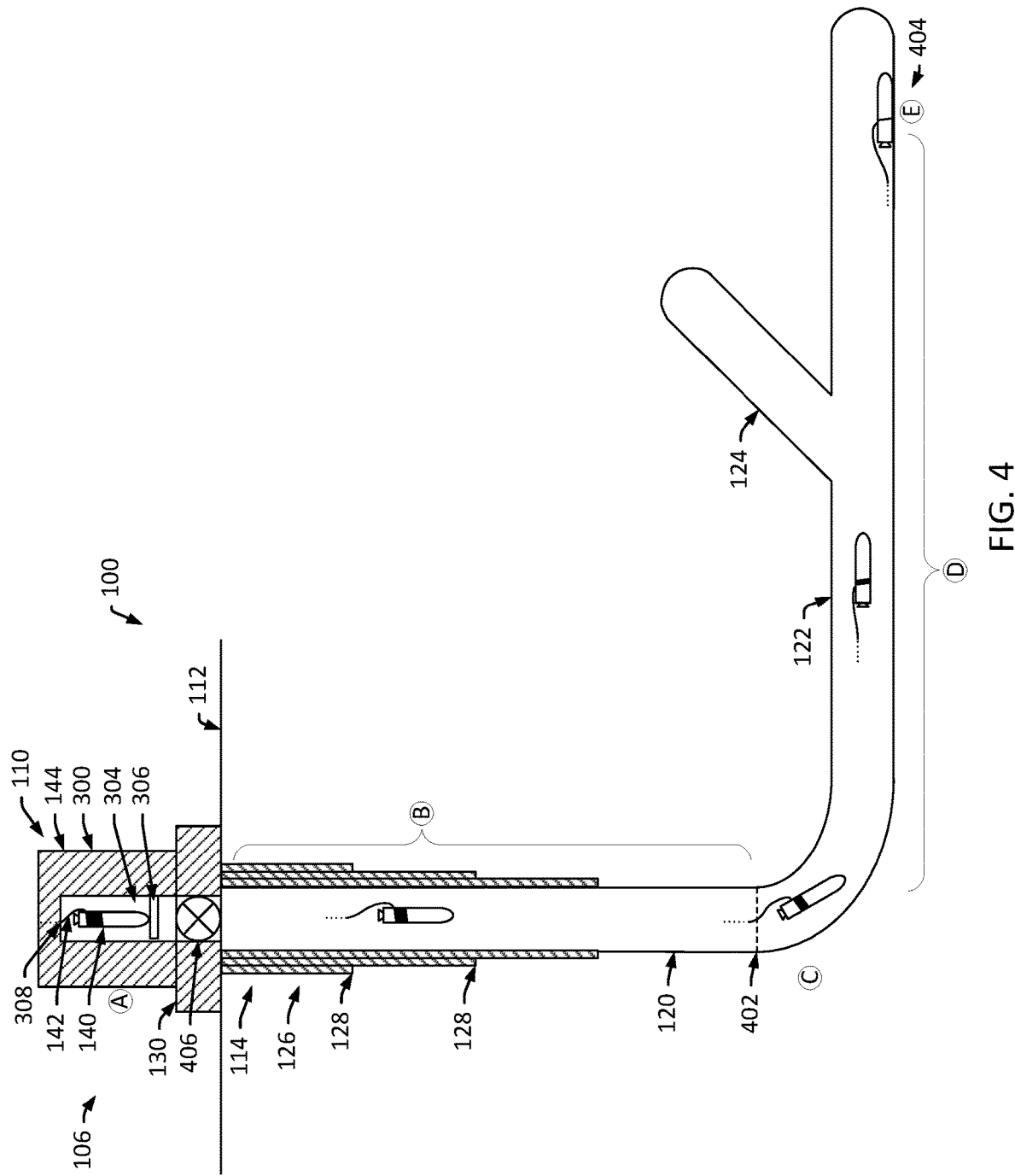
FIG. 4 is a diagram that illustrates deployment of a TPWT in accordance with one or more embodiments.

FIG. 4 is a diagram that illustrates deployment of a TPWT 140 in accordance with one or more embodiments. Referring to the illustrated embodiment of FIG. 4, deployment of a TPWT 140 into a wellbore 120 of a well 114 may include preparing the TPWT 140 for deployment into the wellbore 120 (as illustrated by element "A"), releasing the TPWT 140 into a gravity-driven free-fall in a first/upper-portion of the wellbore 120 (as illustrated by element "B"), in response to the TPWT 140 reaching a trigger point (represented by trigger point 402), igniting or otherwise activating the engine 202 of the TPWT 140 (as represented by element "C") to generate forward thrust that provides thrust-propelled forward advancement of the TPWT 140 in a second/lower-portion of the wellbore 120 (as illustrated by element "D"), with the TPWT 140 coming to rest at a deployment location (represented by deployment location 404) within the wellbore 120 (as illustrated by element "E").

In some embodiments, preparing the TPWT 140 for deployment into the wellbore 120 of the well 114 includes the following: (a) assembling the loaded TPWT 140 into the tree cap chamber 304 of the TPWT tree cap 144; (b) coupling the loaded TPWT tree cap 144 to the wellhead 130 of the well 114; and (c) conducting a pressure test of the TPWT tree cap 144 coupled to the wellhead 130. Assembling the TPWT 140 into the tree cap chamber 304 of the TPWT tree cap 144 may include inserting the loaded TPWT 140 (having an umbilical 142 spooled onto the spool 206 of the TPWT 140) into the tree cap chamber 304, coupling an upper end of the umbilical 142 to the tree cap communication port 308, and moving the TPWT retainer 306 into a closed position to retain the TPWT 140 within the tree cap chamber 304. Coupling the loaded TPWT tree cap 144 to the wellhead 130 of the well 114 may include assembling the loaded TPWT tree cap 144 to the wellhead 130 such that the tree cap sealing flange 302 seals with a complementary sealing flange of the wellhead 130. Conducting a pressure test of the TPWT tree cap 144 coupled to the wellhead 130 may include opening a valve 406 of the wellhead 130 to expose the tree cap chamber 304 to conditions of the wellbore 120, including the fluid pressure of wellbore 120.

In some embodiments, releasing the TPWT 140 into a gravity-driven free-fall in a first/upper-portion of the wellbore 120 includes moving the TPWT retainer 306 to an open position to release the TPWT 140 from the tree cap chamber 304, such that the TPWT 140 falls through a passage of the wellhead 130 and into the wellbore 120. The engine 202 of the TPWT 140 may not be active during initial advancement of the TPWT 140 in the wellbore 120, including the duration of the gravity-driven free-fall in the first/upper-portion of the wellbore 120.

In some embodiments, the trigger point is defined by a predetermined depth within the wellbore 120. For example, the trigger point may be a depth of 1000 meters (m). The trigger point may be specified in the TPWT parameters 134. In such an embodiment, it can be determined that the TPWT 140 has reached the trigger point in response to determining that the TPWT 140 is located at a depth of about 1000 m or more. The depth of the TPWT 140 may be determined, for example, by way of sensing the passage of fixed locations within the wellbore 120. This can include a casing collar locator of the TPWT 140 sensing casing collars 128 as the TPWT 140 passes the casing collars 128 while advancing down the wellbore 120. In some embodiments, the depth of the TPWT 140 is determined based on a length of time the TPWT 140 has been in free-fall. For example, if a trigger point corresponds to a depth of about 1000 m, and it is determined that the TPWT 140 will reach a depth of about 1000 m after 30 seconds of free-fall, it may be determined that the trigger point of 1000 m is reached when the TPWT 140 has been in free-fall for about 30 seconds.

In some embodiments, the trigger point is defined by a predetermined location within the wellbore 120. For example, the trigger point may be the location at which the wellbore transitions from a vertical orientation (for example, the wellbore 120 having a longitudinal axis oriented at about 0° from vertical) to a horizontal orientation (for example, the wellbore 120 having a longitudinal axis oriented at about 45° or more from vertical). In such an embodiment, it may be determined that the TPWT 140 has reached the trigger point in response to determining that the TPWT 140 is oriented at an angle of about 45° or more from vertical. The orientation of the TPWT 140 may be determined, for example, by way of gyroscope sensors of the TPWT 140 sensing an orientation of the TPWT 140.

In some embodiments, the propelled advancement of the TPWT 140 into the second/lower-portion of the wellbore 120 includes operating navigational elements, such as fins, rudders or directional thrust systems to "fly" the TPWT 140 through the wellbore 120. For example, where the deployment location 404 is located in the motherbore 122 of the wellbore 120, the navigational elements, such as fins, rudders or directional thrust systems, may be controlled to direct the TPWT 140 along the motherbore 122 to reach the deployment location 404. As a further example, where the deployment location 404 is located in the lateral bore 124 of the wellbore 120, the navigational elements, such as fins, rudders or directional thrust systems, may be controlled to direct the TPWT 140 along the motherbore 122 and into the lateral bore 124, to reach the deployment location 404. In some embodiments, the TPWT may be "flown" through the wellbore 120 along a predefined route specified in the TPWT parameters 134.

Figure 5:
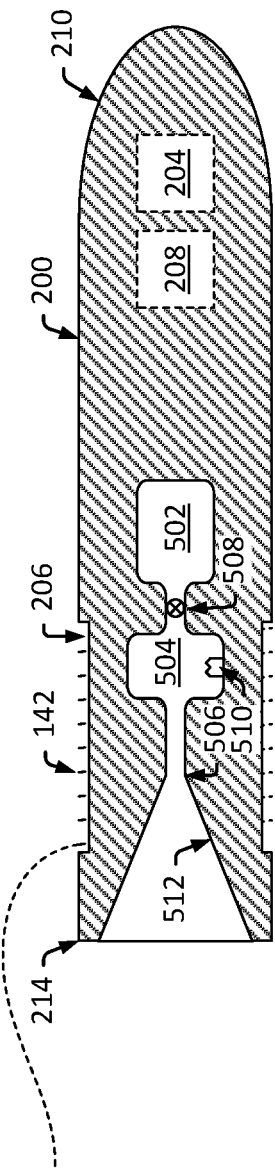
FIGS. 5-8 are diagrams that illustrates example thrust-propelled well torpedo (TPWTs) in accordance with one or more embodiments.

As described, the engine 202 of the TPWT 140 may generate thrust as a result of consumption of a fuel, such as a solid or liquid propellant. FIG. 5 is a diagram that illustrates an example engine 202 of the TPWT 140 in accordance with one or more embodiments. In some embodiments, the engine 202 of the TPWT 140 includes a fuel source 502, a combustion chamber 504, an exhaust port 506 and an igniter 510. In an embodiment in which the fuel is a solid propellant, the fuel source 502 may include the solid propellant. In such an embodiment, the igniter 510 may be positioned near, adjacent or in the solid propellant, and may be activated to ignite the solid propellant. The resulting combustion of the solid propellant may generate hot gas (or "exhaust gas") that is expelled from the exhaust port 506. In an embodiment in which the fuel is a liquid propellant, the fuel source 502 may include a reservoir of the liquid propellant and the engine 202 may include a fuel supply valve or pump may that regulates the flow of the liquid propellant into the combustion chamber 504, which may, in turn, regulate the amount of liquid propellant consumed and hot gas and thrust generated.

The expulsion of the exhaust gas from the exhaust port 506 may generate forward thrust that propels the TPWT 140 forward (for example, toward a down-hole end of the wellbore 120). The igniter 510 may include an element that is activated (for example, using power of a battery of the controller 208) to ignite the fuel, to cause combustion of the fuel. In some embodiments, operation of the igniter 510 is controlled by a controller, such as the TPWT controller 208. The exhaust port 506 may terminate with an exhaust nozzle 512 which directs the reward expulsion of the exhaust gas from the TPWT 140. The exhaust nozzle 512 may include an external or integrated nozzle. For example, in the illustrated embodiment, the exhaust nozzle 512 includes an integrated cone-shaped nozzle formed in the tail end 214 of the body 200 of the TPWT 140.

Figure 6:
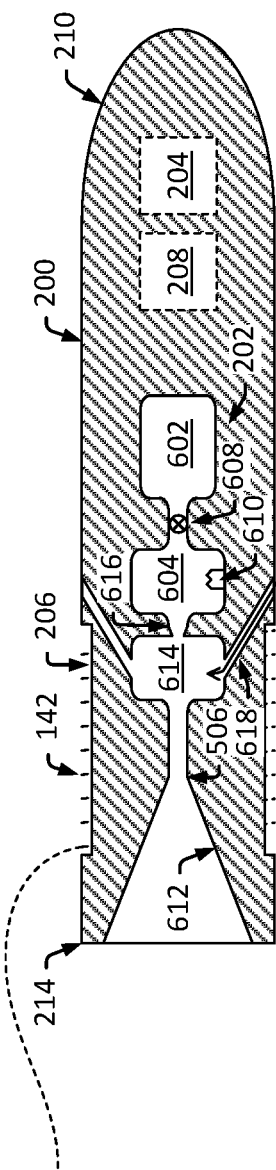
Figure 7:
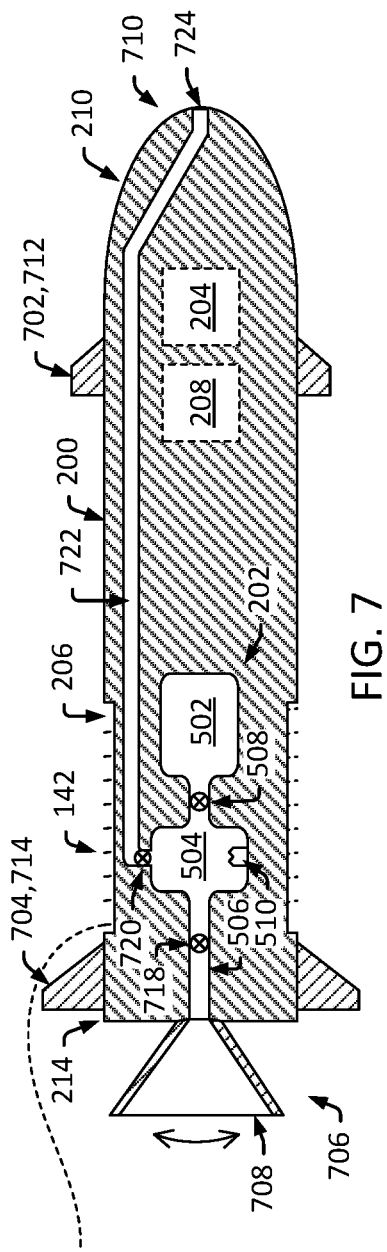

In some embodiment, the engine 202 of the TPWT 140 is a jet-pump engine. FIG. 6 is a diagram that illustrates an example jet-pump engine 202 of the TPWT 140 in accordance with one or more embodiments. In the illustrated embodiment, the jet-pump engine 202 of the TPWT 140 includes a fuel source 602, a combustion chamber 604, an exhaust port 606, an igniter 610, an exhaust nozzle 612, a mixing chamber 614, an inlet nozzle 616 and a well fluid inlet 618. During operation, the fuel may be ignited and combusted to generate hot gas that is expelled through the inlet nozzle 616 and into the mixing chamber 614, where the hot gas is mixed with well fluid 620 routed into the mixing chamber 614 by way of the well fluid inlet 618. The well fluid 620 may include production fluid or other substances located in the wellbore 120 of the well 114 that are routed into the well fluid inlet 618 and the mixing chamber 614 as the TPWT 140 advances in the wellbore 120. The hot gases may mix with the well fluid 620 in the mixing chamber 614 and then be expelled through a throat 622 and exhaust nozzle 612 of the exhaust port 606. The addition of the well fluid 620 may increase the volume of substances being expelled from the exhaust port 606, resulting in a relative increase of thrust generated by the engine 202. The expulsion of the mixture of hot gas and well fluids (or "exhaust gas") from the exhaust port 606 may generate forward thrust that propels the TPWT 140 forward (for example, toward a down-hole end of the wellbore 120). The igniter 610 may include an element that is activated (for example, using power of a battery of the controller 208) to ignite the fuel, to cause combustion of the fuel. In some embodiments, operation of the igniter 610 is controlled by a controller, such as the TPWT controller 208. The exhaust port 606 may terminate with the exhaust nozzle 612, which directs the reward expulsion of the exhaust gas from the TPWT 140. The exhaust nozzle 612 may include an external or integrated nozzle. For example, in the illustrated embodiment, the exhaust nozzle 612 includes an integrated cone-shaped nozzle formed in the tail end 214 of the body 200 of the TPWT 140.

In some embodiments, the TPWT 140 includes navigational elements, such as fins, rudders, or directional thrust systems. The navigational elements may assist in directing the TPWT 140 through the wellbore 120. FIG. 6 is a diagram that illustrates example navigational elements of the TPWT 140 in accordance with one or more embodiments. In the illustrated embodiment, the TPWT 140 includes an engine 202 similar to that described with regard to FIG. 5, although other engines, such as the pump-jet engine of FIG. 6, may be employed. The illustrated TPWT 140 includes stabilizers 702, including fins or rudders, and a directional thrust system 706, including a directional exhaust nozzle 708 and a reverse thrust system 710. A TPWT 140 may include a combination of some or all of the navigational elements described. In the illustrated embodiment, the stabilizers 700 include forward stabilizers 712 and rearward stabilizers 714. In some embodiments, the stabilizers 702 include fins or rudders. For example, the forward stabilizers 712 may include fins and the rearward stabilizers 714 may include rudders. A fin may include a fixed stabilizer (for example, a fixed fin element extending laterally from the body 200) that reduce aerodynamic side slip of the TPWT 140. A rudder may include a movable stabilizer (for example, a rotating fin element extending laterally from the body 200) that provides for steering of the TPWT 140. In some embodiments some of all of the stabilizers 702 may include a combination of a fin and a rudder. For example, a stabilizer 702 may include a wing including a fixed forward fin element extending laterally from the body 200, and a rotating fin element extending from a trailing end of the fixed forward fin element. The fin element may provide for stabilizing the TPWT 140 and the rudder element may provide for steering of the TPWT 140. In some embodiments, the forward stabilizers 712 include fins and the rearward stabilizers 714 include rudders or wings.

In some embodiments, the directional thrust system 706 provides for directing thrust generated by the engine 202 of the TPWT 140 to assist in controlling movement and direction of the TPWT 140. For example the directional exhaust nozzle 708 may include a gimbal mounted exhaust nozzle of the TPWT 140 that can be swiveled to guide a direction of the thrust generated by the engine 202 of the TPWT 140. The resulting change in direction of the thrust can steer the TPWT 140 in different directions. Accordingly, the direction of the directional exhaust nozzle 708 may be controlled to steer the TPWT 140 in different directions. In some embodiments, the direction of the directional exhaust nozzle 708 is controlled by a controller, such as the TPWT controller 208.

As a further example, the reverse thrust system 710 may include a conduit that can be selectively engaged to direct thrust in a forward direction to generate reverse thrust to, for example, slow or stop movement of the TPWT 140 in the forward direction. In the illustrated embodiment, the TPWT 140 includes elements similar to those described with regard to the engine 202 of FIG. 5, in addition to a reverse thrust system 710 that includes a forward thrust control valve 718, a reverse thrust control valve 720, a reverse thrust passage 722 and a reverse thrust port 724. The forward thrust control valve 718 may be a throttle valve that is operable to regulate the flow of hot gas (or "exhaust gas") into the exhaust port 506 and, in turn, regulate the amount of forward thrust generated by the engine 202. The reverse thrust control valve 720 may be a throttle valve that is operable to regulate the flow of hot gas (or "exhaust gas") through the reverse thrust passage 722 and the reverse thrust port 724 and, in turn, regulate the amount of reverse thrust generated by the engine 202. During a reverse thrust operation, the reverse thrust control valve 720 may be at least partially opened or the forward thrust control valve may be at least partially closed, to direct hot gas (or "exhaust gas") through the reverse thrust passage 722 and the reverse thrust port 724. The expulsion of the exhaust gas from the reverse thrust port 724 may result in thrust in the forward direction to generate reverse thrust to, for example, slow or stop movement of the TPWT 140 in the forward direction (for example, toward a down-hole end of the wellbore 120). In some embodiments, the reverse thrust is of sufficient magnitude to cause the movement of the TPWT 140 in the reverse direction (for example, toward an up-hole end of the wellbore 120). In some embodiments, operation of the forward thrust control valve 718 or the reverse thrust control valve 720 is controlled by a controller, such as the TPWT controller 208. A similar reverse thrust system may be incorporated in a TPWT 140 having a jet-pump style engine. For example, referring to FIG. 6, a similar reverse thrust passage may extend from the combustion chamber 604 or the mixing chamber 614, with a reverse thrust control valve regulating flow through the reverse thrust passage, and a forward thrust control valve located between the combustion chamber 604 and the mixing chamber 614 (or between the mixing chamber 614 and the exhaust port 606) regulating flow through the exhaust port 606.

Figure 8:
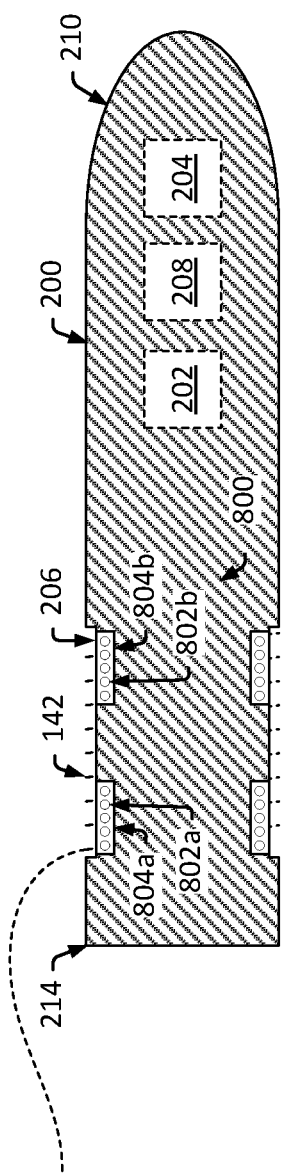

In some embodiments, the TPWT 140 includes a locating system, such as a casing collar locator ("CCL") that is operable to sense casing collars 128 as the TPWT 140 passes the casing collars 128 while advancing down the wellbore 120. FIG. 8 is a diagram that illustrates an example casing collar locator ("CCL") 800 of the TPWT 140 in accordance with one or more embodiments. In the illustrated embodiment, the CCL 800 includes a two CCL coils 802*a* and 802*b* residing radially internal to the recess of the spool 206. Each of the coils 802*a* and 802*b* may include a coil of electrically conductive wire (for example, copper wire) that is wrapped into respective circumferential depressions (or "recesses") 804*a* and 804*b* that extend radially inward from the recess forming the spool 206. During use, the coils 802*a* and 802*b* may be electrified to create an electromagnet that is capable of sensing changes in magnetic field caused by changes in tubular thickness of a surrounding metal tubular in the wellbore 120, such as the casing 126. As the TPWT 140 travels through the wellbore 120 and passes the locations at which a surrounding metal tubular changes in thickness, such as at a casing collars 128, the coils 802*a* and 802*b* may detect a corresponding change in magnetic field, in sequence, and the change can be attributed to the TPWT 140 being located at or passing the location of the change. For example, as the TPWT 140 travels through the wellbore 120 and passes the first casing collar 128 known to be at a depth of 100 m, the coils 802*a* and 802*b* may detect a first change in magnetic field at a first time, and it can be determined that the TPWT 140 is located at the depth of 100 m at the first time. As the TPWT 140 continues to travel through the wellbore 120 and passes the second casing collar 128 known to be at a depth of 200 m, the coils 802*a* and 802*b* may detect a second change in magnetic field at a second time, and it can be determined that the TPWT 140 is located at the depth of 200 m at the second time, and so forth.

Figure 9:
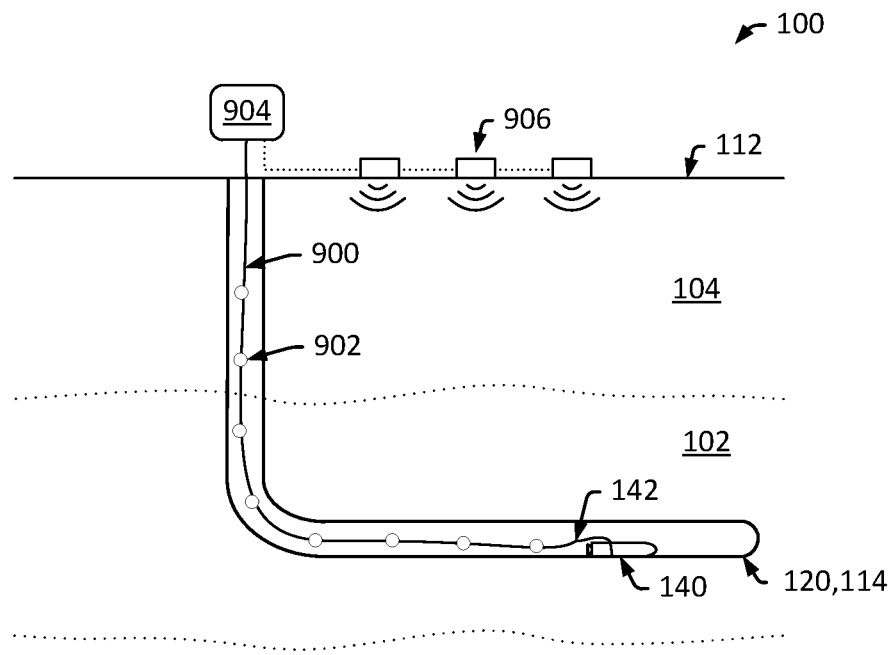
FIGS. 9 and 10 are diagrams that illustrates example well distributed acoustic sensing (DAS) using TPWTs in accordance with one or more embodiments.

In some embodiments, the TPWT 140 is used to deploy acoustic sensors, such as FO line, for DAS. DAS may be used, for example, for vertical seismic profiling of a well. FIG. 9 is a diagram that illustrates deployment of a DAS FO line into a wellbore 120 of the well 114 in accordance with one or more embodiments. In the illustrated embodiment, the umbilical 142 includes a DAS FO line 900. When the TPWT 140 is deployed into the well 114, the DAS FO line may be unspooled into the wellbore 120, resulting in the DAS FO line 900 being distributed at along a length of the wellbore 120. In some embodiments, an interrogator 904 coupled to the DAS FO line 900, such as the well control system 118, monitors seismic events sensed by the DAS FO line 900. The seismic events may be seismic echoes resulting, for example, from seismic signals generated by an array of seismic sources 906 located at the surface 112.

In some embodiments, the DAS FO line 900 forming the umbilical 142 is sized to facilitate contact between the DAS FO line 900 and a lining of the wellbore 120, such as an interior wall of the casing 126. For example, a DAS FO line 900 may have a length that is about 125% of a length portion of the wellbore 120 to be lined with the DAS FO line 900. This extra length may facilitate the DAS FO line 900 expanding radial to adhere (or "stick") to the tubular walls, such as the interior walls of the casing 126, by way of surface tension. As a result, the DAS FO line 900 may take a spiral or helical shape, sticking to the tubular walls of the wellbore 120. The resulting coupling of the DAS FO line 900 with the tubular walls can help to reduce attenuation of seismic events sensed by the DAS FO line 900.

Figure 10:
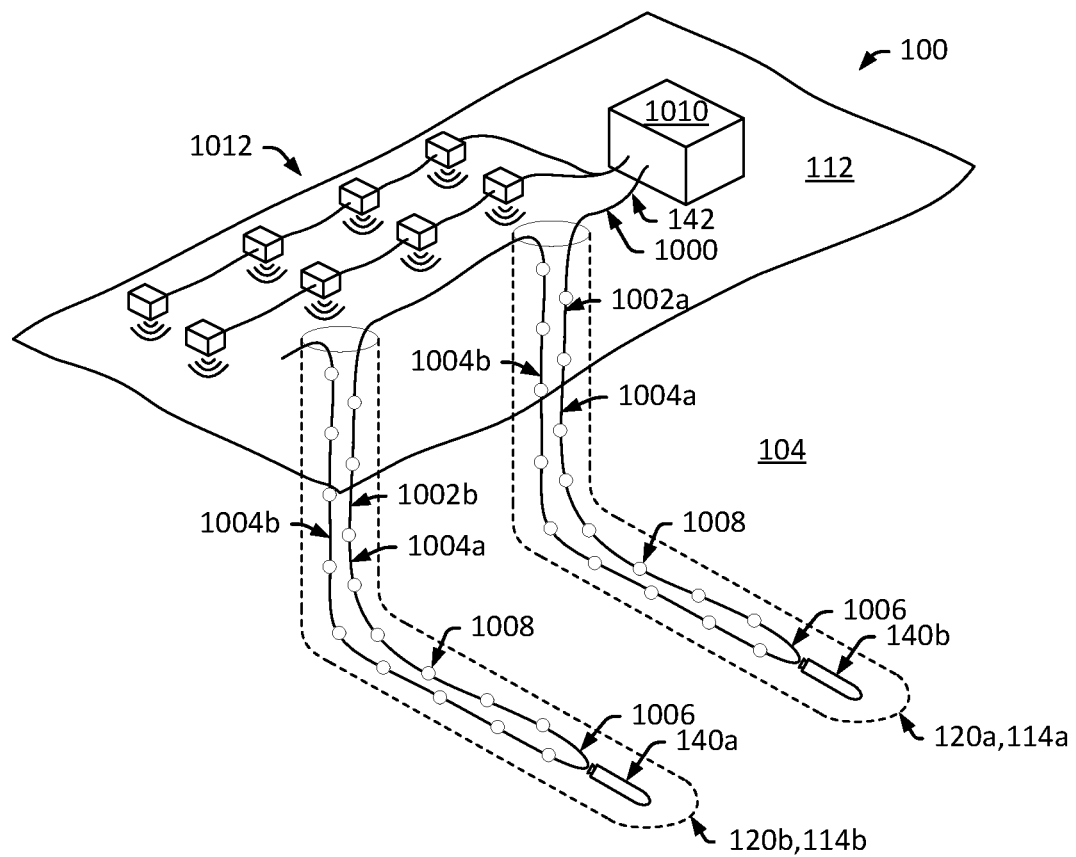

FIG. 10 is a diagram that illustrates deployment of U-bend style DAS FO line into multiple wellbores in accordance with one or more embodiments. In the illustrated embodiment, the umbilical 142 includes a U-bend style DAS FO line 1000 deployed into multiple wellbores 120*a* and 120*b* of respective wells 114*a* and 114*b* by way of respective TPWTs 140*a* and 140*b*. The DAS FO line 1000 may include multiple down-hole portions 1002*a* and 1002*b* that are each deployed into respective wellbore 120*a* and 120*b*. The down-hole portions 1002*a* and 1002*b* may each include first and second DAS FO segments 1004*a* and 1004*b* that are connected to one another by way of a U-bend 1006. The U-bend 1006 may include a rigid 180° bend in the DAS FO line that provides a curved transition between the first and second DAS FO line segments 1004*a* and 1004*b*. In some embodiments, the U-bend 1006 includes a "mini-bend", such as a MiniBend® Fiber Optic Component, provided by AFL, having headquarters in Duncan, S.C., USA.

During a deployment operation for each of the respective wellbores 120*a* and 120*b*, the respective down-hole portion 1002*a* or 1002*b* of the U-bend style DAS FO line 1000 may be spooled onto a spool 206 of the respective TPWTs 140*a* or 140*b*, and the TPWTs 140*a* or 140*b* may be deployed into the respective wellbores 120*a* or 120*b* to deploy the respective down-hole portions 1002*a* or 1002*b* into the respective wellbores 120*a* or 120*b*. As illustrated, as a result of a deployment operation, the TPWT 140*a* and 140*b* and the respective the down-hole portions 1002*a* and 1002*b* may be deposited in a down-hole portion of the respective wellbore 120*a* and 120*b*, with each of the first and second DAS FO segments 1004*a* and 1004*b* of the down-hole portions 1002*a* and 1002*b* extending along the respective wellbores 120*a* and 120*b*, to the surface 112. In some embodiments, an interrogator 1010 coupled to the DAS FO line 1000, such as the well control system 118, monitors seismic events sensed by the respective down-hole portions 1002*a* and 1002*b* of the DAS FO line 1000. The seismic events may be seismic echoes resulting, for example, from seismic signals generated by an array of seismic sources 1012 located at the surface 112.

Figure 12:
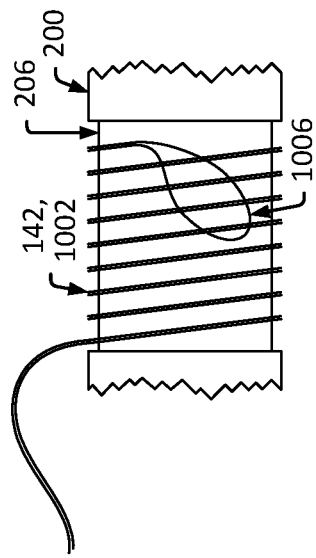
FIGS. 11 and 12 are diagrams that illustrates example spooling of U-bend style DAS fiber optic (FO) lines in accordance with one or more embodiments.
Figure 11:
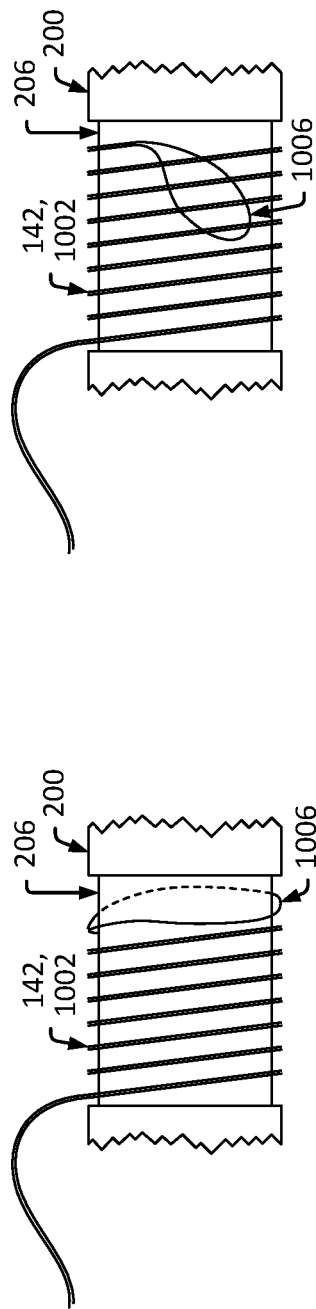

In some embodiments, the U-bend 1006 of a down-hole segment 1002 of a U-bend style DAS FO line 1000 is wrapped about a spool 206 of a TPWT 140 in a manner to maintain and protect the curved shape of the U-bend 1006. As illustrated in FIG. 11, in some embodiments, the U-bend 1006 of the down-hole segment 1002 of the U-bend style DAS FO line 1000 is wrapped about a circumference of the spool 206 of the TPWT 140 to maintain and protect the curved shape of the U-bend 1006. In such an embodiment, loading of the spool 206 may include wrapping the U-bend 1006 about the circumference of the spool 206, and subsequently winding the down-hole segment 1002 of the U-bend style DAS FO line 1000 about the U-bend 1006 or the circumference of the spool 206. As illustrated in FIG. 12, in some embodiments, the U-bend 1006 is secured to a face of the spool 206, with the down-hole segment 1002 of the U-bend style DAS FO line 1000 being wrapped about a circumference of the spool 206 of the TPWT 140 to maintain and protect the curved shape of the U-bend 1006. For example, the U-bend 1006 may be "tucked" under wraps of the down-hole segment 1002 of the U-bend style DAS FO line 1000 to maintain and protect the curved shape of the U-bend 1006. In such an embodiment, loading of the spool 206 may include placing the U-bend 1006 against a surface of the spool 206, and subsequently winding the down-hole segment 1002 of the U-bend style DAS FO line 1000 about the U-bend 1006 and the circumference of the spool 206. Such a tucked configuration may be suitable for use with a mini-bend type U-bend 1006. For example, a mini-bend type U-bend 1006 may be tucked under wraps of the down-hole segment 1002 of the U-bend style DAS FO line 1000 to maintain and protect the curved shape of the U-bend 1006.

Figure 13:
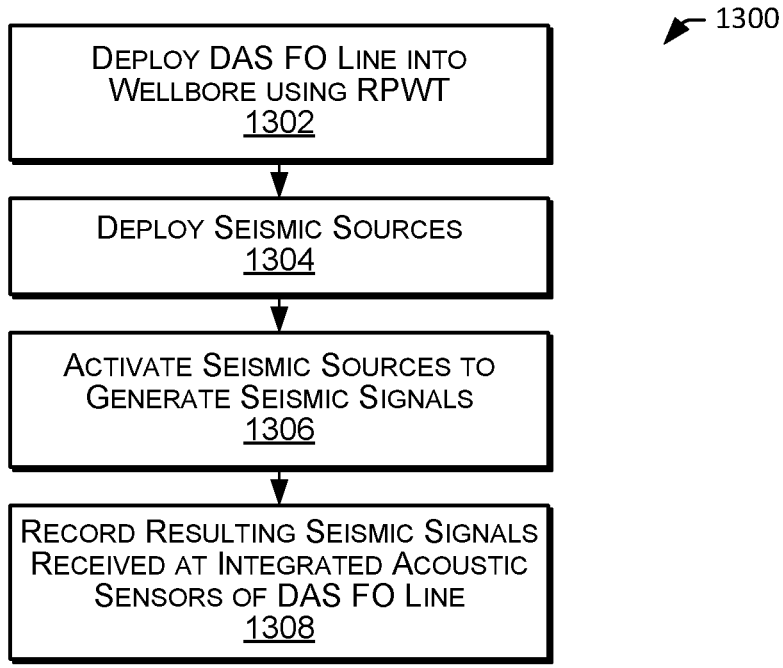
FIG. 13 is a flowchart diagram that illustrates a method of DAS sensing using a TPWT in accordance with one or more embodiments

FIG. 13 is a flowchart diagram that illustrates a method of DAS sensing 1300 in accordance with one or more embodiments. The method 1300 may include deploying a DAS FO line into a wellbore using a TPWT (block 1302). In some embodiments, deploying DA FO line into a wellbore includes deploying a DAS FO line into one or more wellbores using one or more TPWTs. For example, deploying DAS FO line into a wellbore using a TPWT may include deploying the DAS FO line 900 into the wellbore 120, as described with regard to at least FIG. 9. As a further example, deploying a DAS FO line into a wellbore using a TPWT may include deploying the U-bend style DAS FO line 1000 into the wellbores 120a and 120b, as described with regard to at least FIG. 10.

The method 1300 may include deploying seismic sources (block 1304). In some embodiments, deploying seismic sources includes deploying one or more seismic generators operable to generate seismic signals. For example, deploying seismic sources may include positioning an array of seismic sources 906 at the surface 112, as described with regard to at least FIG. 9. As a further example, deploying seismic sources may include positioning an array of seismic sources 1012 at the surface 112, as described with regard to at least FIG. 10.

The method 1300 may include activating the seismic sources to generate seismic signals (block 1306) and recording resulting seismic signals received at the DAS FO line (block 1308). In some embodiments, activating the seismic sources to generate seismic signals includes operating the seismic sources to generate seismic signals that penetrate a formation. For example, activating the seismic sources to generate seismic signals may include an interrogator, such as the well control system 118, controlling the seismic sources 906 or 1012 to generate seismic signals that penetrate the formation 104. In some embodiments, recording resulting seismic signals received at the DAS FO line includes recording seismic signals sensed at the DAS FO line. For example, with regard to the DAS FO line 900 described with regard to at least FIG. 9, recording resulting seismic signals received at the DAS FO line may include the well control system 118 recording seismic signals sensed as discrete locations along the portion of the DAS FO line 900 located in the wellbore 120. As a further example, with regard to the DAS FO line 1000 described with regard to at least FIG. 10, recording resulting seismic signals received at the DAS FO line may include the well control system 118 recording seismic signals simultaneously sensed along the first and second DAS FO segments 1004a and 1004b of the down-hole portions 1002a and 1002b disposed in the wellbores 120a and 120b.

In some embodiments, various operations can be undertaken based on the seismic data obtained by way of a DAS FO line. For example, the recorded acoustic data can be used to determine characteristics of the formation 104 and the reservoir 102, which can in turn be used to determine appropriate operating parameters for the well 114 (or wells 114a and 114b), such as production rates or production pressures for the well 114 (or wells 114a and 114b), or to determine appropriate locations and trajectories for additional wells in the formation 104. The well 114 (or wells 114a and 114b), or other wells in the formation 104, can be operated in accordance with the determined operating parameters, or other wells can be drilled into the formation 104 at the locations and with the trajectories determined.

Figure 14:
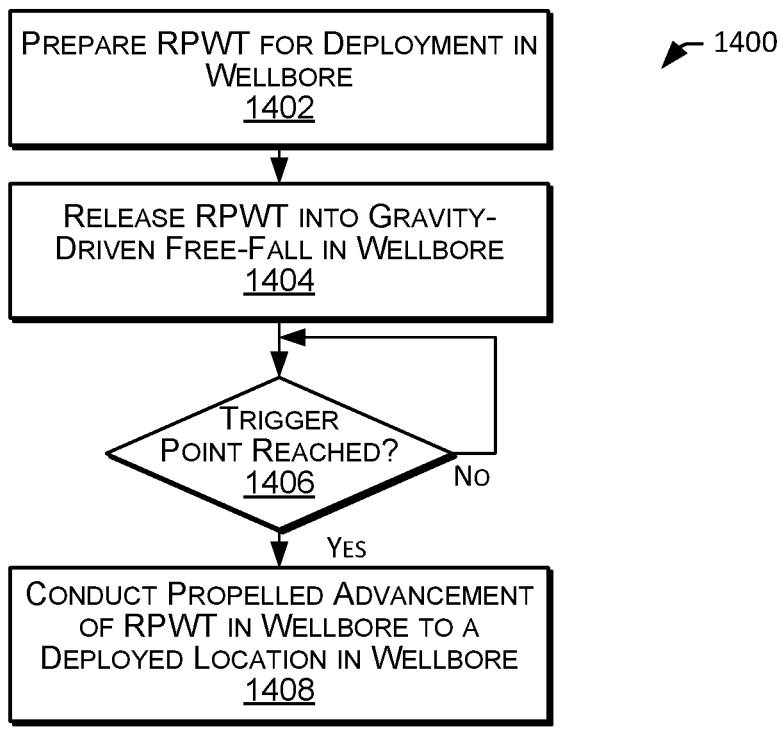
FIG. 14 is a flowchart diagram that illustrates a method of deploying a TPWT into a well in accordance with one or more embodiments.

FIG. 14 is a flowchart diagram that illustrates a method of deploying a TPWT into a well 1400 accordance with one or more embodiments. The method 1400 may include preparing a TPWT for deployment in a wellbore (block 1402). In some embodiments, preparing a TPWT for deployment in a wellbore includes preparing a TPWT 140 for deployment into a wellbore 120 of a well 114. For example, preparing the TPWT 140 for deployment may include a well operator performing the following operations: (a) loading a spool 206 of a TPWT 140 with an umbilical 142 (for example, a FO line, a DAS FO line or a U-bend style DAS FO line); (a) assembling the TPWT 140 into a tree cap chamber 304 of a TPWT tree cap 144; (b) coupling the "loaded" TPWT tree cap 144 to a wellhead 130 of the well 114; and (c) conducting a pressure test of the TPWT tree cap 144 coupled to the wellhead 130.

The method 1400 may include releasing the TPWT into a gravity-driven free-fall in the wellbore (block 1404). In some embodiments, releasing the TPWT into a gravity-driven free-fall in the wellbore includes releasing the loaded TPWT 140 into a gravity-driven free-fall in a first/upper-portion of the wellbore 120. For example, the well control system 118 or other well operator may control operation of the tree cap 144 to move the TPWT retainer 306 to an open position to release the TPWT 140 from the tree cap chamber 304, such that the TPWT 140 falls through the wellhead 130 and into a first/upper-portion of the wellbore 120.

The method 1400 may include determining whether the TPWT has reached a trigger point (block 1406). In some embodiments, determining whether the TPWT has reached a trigger point includes monitoring advancement of the TPWT within the wellbore 120 to determine whether the TPWT 140 has reached a trigger point. For example, a controller, such as a the well control system 118 or the TPWT controller 208, may determine, based on a timed duration of the fall or navigational data indicative of a speed, location or orientation of the TPWT 140, whether the TPWT 140 has reached the trigger point 402.

The method 1400 may include, in response to determining that the TPWT has reached the trigger point, conducting propelled advancement of the TPWT in the wellbore to a deployment location in the wellbore (block 1408). In some embodiments, conducting propelled advancement of the TPWT in the wellbore to a deployment location in the wellbore includes operating the engine 202 of the TPWT 140 to generate thrust to propel the TPWT 140 into the second/lower-portion of the wellbore 120, with the TPWT 140 coming to rest at a deployment location 404 in the wellbore 120. For example, a controller, such as a the well control system 118 or the TPWT controller 208, may control the ignition and operation of the engine 202 and control operation of other navigational elements, such as fins, rudders or directional thrust systems to "fly" the TPWT 140 through the wellbore 120, to the deployment location 404. In some embodiments, control of the TPWT 140 is provided by navigational commands initiated locally by the TPWT controller 208, or navigational commands provided to the TPWT controller 208, from the well control system 118 by way of the umbilical 142.

The method 1400 may include monitoring the payload of the TPWT (block 1410). In some embodiments, monitoring the payload of the TPWT includes monitoring data received from the payload 204 of the TPWT 140. For example, where the payload 204 includes BHP sensors or BHT sensors, a controller, such as the well control system 118, may monitor operational data, including BHP data and BHT data indicative of the BHP or BHT at the deployment location 404 in the wellbore 120. As a further example, where the payload 204 includes a DAS FO line, a controller, such as a the well control system 118, may monitoring operational data, including acoustic data indicative of seismic events sensed by the DAS FO line 900 or 1000 deployed in the wellbore 120.

In some embodiments, various operations can be undertaken based on the data obtained by way of a payload 204 of a TPWT 140 deployed into a well 114. For example, where the payload 204 includes BHP sensors or BHT sensors, the corresponding BHP data and BHT data can be used to determine a BHP and BHT for the well 114, which can, in turn, be used to determine appropriate operating parameters for the well 114, such as production rates or production pressures for the well 114, and the well 114, or other wells in the formation 104, can be operated in accordance with the determined operating parameters. As a further example, where the payload 204 includes a DAS FO line, the acoustic data can be used to determine characteristics of the formation 104 and the reservoir 102, which can, in turn, be used to determine appropriate operating parameters for the well 114, such as production rates or production pressures for the well 114, or to determine appropriate locations and trajectories for additional wells in the formation 104. The well 114, or other wells in the formation 104, can be operated in accordance with the determined operating parameters, or other wells can be drilled into the formation at the locations and with the trajectories determined.

Figure 15:
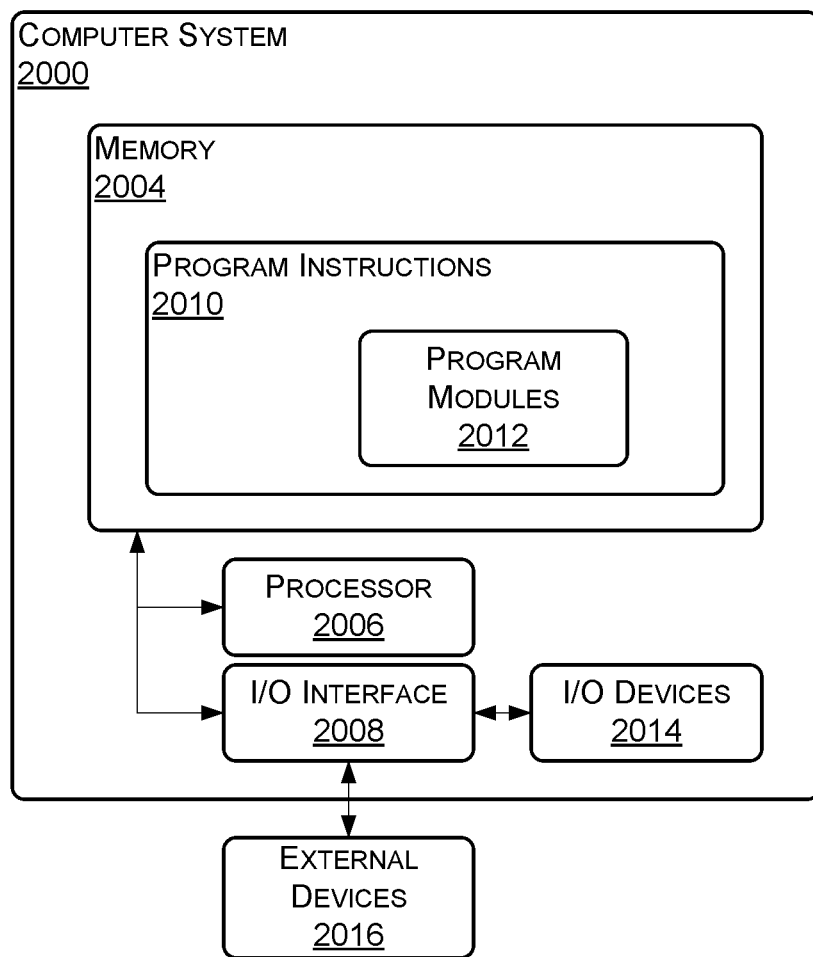
FIG. 15 is a diagram that illustrates an example computer system, in accordance with one or more embodiments.

FIG. 15 is a diagram that illustrates an example computer system (or "system") 2000 in accordance with one or more embodiments. In some embodiments, the system 2000 includes a memory 2004, a processor 2006 and an input/output (I/O) interface 2008. The memory 2004 may include non-volatile memory (for example, flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (for example, CD-ROM or DVD-ROM, hard drives). The memory 2004 may include a non-transitory computer-readable storage medium having program instructions 2010 stored thereon. The program instructions 2010 may include program modules 2012 that are executable by a computer processor (for example, the processor 2006) to cause the functional operations described, such as those described with regard to the well control system 118, the TPWT controller 208, the method 1300 or the method 1400.

The processor 2006 may a processor capable of executing the program instructions 2010. For example, the processor 2006 may include a central processing unit (CPU) that carries out program instructions (for example, the program instructions of the program modules 2012) to perform the arithmetical, logical, or input/output operations described here. The processor 2006 may include one or more processors. The I/O interface 2008 may provide an interface for communication with one or more I/O devices 2014, such as a joystick, a computer mouse, a keyboard, or a display screen (for example, an electronic display for displaying a graphical user interface (GUI)). The I/O devices 2014 may be connected to the I/O interface 2008 by way of a wired connection (for example, an Industrial Ethernet connection) or a wireless connection (for example, a Wi-Fi connection). The I/O interface 2008 may provide an interface for communication with one or more external devices 2016. In some embodiments, the I/O interface 2008 includes one or both of an antenna and a transceiver. In some embodiments, the external devices 2016 include sensors or other computer systems.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (that is, meaning having the potential to), rather than the mandatory sense (that is, meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from, unless indicated otherwise. Thus, for example, receiving an item "from" an entity may include receiving an item directly from the entity or indirectly from the entity (for example, by way of an intermediary entity). Unless specifically stated otherwise, as apparent from the discussion, it is appreciated that throughout this specification discussions utilizing terms such as "processing," "computing," "calculating," "determining" or the like may refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method of deploying distributed acoustic sensing (DAS) sensors in a subterranean well, the method comprising:
    releasing a torpedo into gravity-driven advancement within a first portion of a wellbore of a subterranean well, the torpedo comprising:
        a distributed acoustic sensing (DAS) fiber-optic (FO) umbilical that is physically coupled to a surface component and configured to unspool from the torpedo as the torpedo advances in the wellbore; and
        an engine configured to generate thrust to propel advancement of the torpedo in the wellbore;
    determining that the torpedo has reached a trigger point comprising a predefined depth within the wellbore; and
    activating, in response to determining that the torpedo has reached the trigger point within the wellbore, the engine to generate forward thrust to propel the torpedo within a horizontal portion of the wellbore such that at least some of the DAS FO umbilical is disposed in the horizontal portion of the wellbore, and the torpedo comes to rest at a deployment location within the wellbore.

2. A method of distributed acoustic sensing in a subterranean well, the method comprising:
    advancing a torpedo into a first portion of a wellbore of a subterranean well, the torpedo comprising:
        a distributed acoustic sensing (DAS) fiber-optic (FO) umbilical that is physically coupled to a surface component and configured to unspool from the torpedo as the torpedo advances in the wellbore; and
        an engine configured to generate thrust to propel the torpedo;
    determining that the torpedo has reached a trigger point comprising a predefined depth within the wellbore; and
    activating, in response to determining that the torpedo has reached the trigger point within the wellbore, the engine to generate thrust to propel advancement of the torpedo within a second portion of the wellbore such that at least some of the DAS FO umbilical is disposed in the second portion of the wellbore.

3. The method of claim 2, wherein subsequent to the torpedo coming to rest in the deployment location, the DAS FO umbilical extends from the surface component into the second portion of the wellbore.

4. The method of claim 2, further comprising, subsequent to the torpedo coming to rest at the deployment location within the wellbore, conducting a seismic operation comprising sensing seismic events by way of the DAS FO umbilical unspooled in the wellbore.

5. The method of claim 4, further comprising positioning a plurality of seismic sources at surface locations, wherein the seismic operation further comprises operating the seismic sources to generate seismic signals, and wherein the seismic events correspond to the seismic signals generated.

6. The method of claim 2, further comprising, subsequent to the torpedo coming to rest at the deployment location within the wellbore, conducting a fluid flow monitoring operation comprising sensing fluid flow by way of the DAS FO umbilical unspooled in the wellbore.

7. The method of claim 2, further comprising, subsequent to the torpedo coming to rest at the deployment location within the wellbore, conducting a leak monitoring operation comprising sensing a leak by way of the integrated acoustic sensors of the DAS FO umbilical unspooled in the wellbore.

8. The method of claim 2, wherein the DAS FO umbilical comprises a single segment of FO line.

9. The method of claim 2, wherein the DAS FO line comprises a U-bend style DAS FO line comprising a first segment of the DAS FO line and a second segment of the DAS FO line connected by way of a U-bend.

10. The method of claim 9, wherein the torpedo comprises a cylindrical spool, the method further comprising wrapping the U-bend about a circumference of the spool, and wrapping the first and second segments of the DAS FO line about the U-bend wrapped about the circumference of the spool.

11. The method of claim 9, wherein the torpedo comprises a cylindrical spool, the method further comprising disposing the U-bend on a surface of the spool, and wrapping the first and second segments of the DAS FO line about the U-bend disposed on the surface of the spool.

12. The method of claim 9, wherein the U-bend comprises a mini-bend connector.

13. The method of claim 9, wherein a first portion of the DAS FO umbilical comprising the a first segment of the DAS FO, the second segment of the DAS FO line and the U-bend is disposed in the wellbore using the torpedo, the method further comprising deploying a second portion of the DAS FO umbilical into a second wellbore using a second torpedo, the second portion of the DAS FO umbilical comprising a third segment of the DAS FO line and a fourth segment of the DAS FO line connected by way of a second U-bend.

14. The method of claim 13, further comprising conducting a seismic operation comprising sensing seismic events by way of the first portion of the DAS FO umbilical disposed in the wellbore and the second portion of the DAS FO umbilical disposed in the second wellbore.

15. The method of claim 2, wherein the torpedo comprises a body formed of a dissolvable material configured to dissolve in the wellbore, the method further comprising leaving the torpedo at the deployment location such that the body of the torpedo dissolves at the deployment location within the wellbore.

16. The method of claim 2, wherein the DAS FO umbilical is coupled to a well control system and is configured to facilitate communication between the torpedo and the well control system, the method further comprising the well control system receiving data from the torpedo by way of the DAS FO umbilical.

17. The method of claim 2, wherein the second portion of the wellbore comprises a horizontal portion of the wellbore.

18. The method of claim 2, wherein the first portion of the wellbore comprises a vertical portion of the wellbore and the second portion of the wellbore comprises a horizontal portion of the wellbore, and wherein the trigger point within the wellbore comprises a point of transition between the vertical portion of the wellbore and the horizontal portion of the wellbore.

19. A non-transitory computer readable storage medium comprising program instructions stored thereon that are executable by a processor to cause the following operations:
advancing a torpedo into a first portion of a wellbore of a subterranean well, the torpedo comprising:
a distributed acoustic sensing (DAS) fiber-optic (FO) umbilical that is physically coupled to a surface component and configured to unspool from the torpedo as the torpedo advances in the wellbore; and
an engine configured to generate thrust to propel the torpedo;
determining that the torpedo has reached a trigger point comprising a predefined depth within the wellbore; and
activating, in response to determining that the torpedo has reached the trigger point within the wellbore, the engine to generate thrust to propel advancement of the torpedo within a second portion of the wellbore such that at least some of the DAS FO umbilical is disposed in the second portion of the wellbore.

20. A subterranean well torpedo system comprising:
a control system; and
a torpedo comprising:
a distributed acoustic sensing (DAS) fiber-optic (FO) umbilical that is physically coupled to a surface component and configured to unspool from the torpedo as the torpedo advances in the wellbore; and
an engine configured to generate thrust to propel the torpedo;
the control system configured to:
advance the torpedo into a first portion of the wellbore of the subterranean well;
determine that the torpedo has reached a trigger point comprising a predefined depth within the wellbore; and
activate, in response to determining that the torpedo has reached the trigger point within the wellbore, the engine to generate thrust to propel the torpedo within a second portion of the wellbore such that at least some of the DAS FO umbilical is disposed in the second portion of the wellbore.

21. The system of claim 20, wherein the first portion of the wellbore comprises a vertical portion of the wellbore and the second portion of the wellbore comprises a horizontal portion of the wellbore, and wherein the trigger point within the wellbore comprises a point of transition between the first wellbore portion and the second wellbore portion of the wellbore.

22. The system of claim 20, wherein the DAS FO umbilical has a length that is at least 25% greater than a distance between the surface component and a target deployment location within the wellbore.

23. The system of claim 20, wherein subsequent to the torpedo coming to rest in the deployment location, the DAS FO umbilical extends from the surface component into the second portion of the wellbore.

24. The system of claim 20, wherein the control system is further configured to, subsequent to the torpedo coming to rest at the deployment location within the wellbore, conduct a seismic operation comprising sensing seismic events by way of the DAS FO umbilical unspooled in the wellbore.

25. The system of claim 24, wherein a plurality of seismic sources are positioned at surface locations, and wherein the seismic operation further comprises operating the seismic sources to generate seismic signals, and wherein the seismic events correspond to the seismic signals generated.

26. The system of claim 20, wherein the control system is further configured to, subsequent to the torpedo coming to rest at the deployment location within the wellbore, conduct a fluid flow monitoring operation comprising sensing fluid flow by way of the DAS FO umbilical unspooled in the wellbore.

27. The system of claim 20, wherein the control system is further configured to, subsequent to the torpedo coming to rest at the deployment location within the wellbore, conduct a leak monitoring operation comprising sensing a leak by way of the DAS FO umbilical unspooled in the wellbore.

28. The system of claim 20, wherein the DAS FO umbilical comprises a single segment of FO line.

29. The system of claim 20, wherein the DAS FO line comprises a U-bend style DAS FO line comprising a first segment of the DAS FO line and a second segment of the DAS FO line connected by way of a U-bend.

30. The system of claim 29, wherein the torpedo comprises a cylindrical spool, and wherein the U-bend is wrapped about a circumference of the spool, with the first and second segments of the DAS FO line wrapped about the U-bend wrapped about the circumference of the spool.

31. The system of claim 29, wherein the torpedo comprises a cylindrical spool, and wherein the U-bend is disposed on a surface of the spool, with the first and second segments of the DAS FO line wrapped about the U-bend disposed on the surface of the spool.

32. The system of claim 29, wherein the U-bend comprises a mini-bend connector.

33. The system of claim 29, wherein a first portion of the DAS FO umbilical comprises the first segment of the DAS FO, the second segment of the DAS FO line and the U-bend, the first portion of the DAS FO line is disposed in the wellbore using the torpedo, and a second portion of the DAS FO umbilical is disposed in a second wellbore, the second portion of the DAS FO umbilical comprising a third segment of the DAS FO line and a fourth segment of the DAS FO line connected by way of a second U-bend.

34. The system of claim 33, wherein the control system is further configured to conduct a seismic operation comprising sensing seismic events by way of the first portion of the DAS FO umbilical disposed in the wellbore and the second portion of the DAS FO umbilical disposed in the second wellbore.

35. The system of claim 20, wherein the torpedo comprises a body formed of a dissolvable material configured to dissolve in the wellbore.

36. The system of claim 20, wherein the DAS FO umbilical is coupled to a well control system and is configured to facilitate communication between the torpedo and the well control system.

37. The system of claim 20, wherein the second portion of the wellbore comprises a horizontal portion of the wellbore.

* * * * *